(12) United States Patent
Tsuji et al.

(10) Patent No.: US 7,573,524 B2
(45) Date of Patent: Aug. 11, 2009

(54) LIQUID CRYSTAL LIGHT CONTROL ELEMENT, LENS BARREL, AND IMAGING DEVICE

(75) Inventors: Takumi Tsuji, Chiba (JP); Toru Udaka, Kanagawa (JP); Masaki Ando, Chiba (JP); Kazuhiro Tanaka, Tokyo (JP)

(73) Assignee: Sony Corporation, Tokyo (JP)

( * ) Notice: Subject to any disclaimer, the term of this patent is extended or adjusted under 35 U.S.C. 154(b) by 708 days.

(21) Appl. No.: 11/070,633

(22) Filed: Mar. 2, 2005

(65) Prior Publication Data

US 2005/0195313 A1    Sep. 8, 2005

(30) Foreign Application Priority Data

Mar. 3, 2004    (JP)    ............... 2004-059130

(51) Int. Cl.
*H04N 5/225*    (2006.01)

(52) U.S. Cl. .................. 348/340; 348/374; 349/128; 359/253

(58) Field of Classification Search ............ 348/333.01; 349/179–181
See application file for complete search history.

(56) References Cited

U.S. PATENT DOCUMENTS

| | | | | |
|---|---|---|---|---|
| 4,431,288 | A * | 2/1984 | Iwata et al. .................. 396/89 |
| 5,090,794 | A * | 2/1992 | Hatano et al. ................. 349/78 |
| 6,246,832 | B1 * | 6/2001 | Terada ........................ 396/63 |
| 6,603,526 | B2 * | 8/2003 | Kim et al. ................... 349/141 |
| 6,791,657 | B2 * | 9/2004 | Yanagida et al. ............ 349/165 |
| 7,110,155 | B2 * | 9/2006 | Nito et al. ................... 359/253 |
| 7,245,325 | B2 * | 7/2007 | Yamaguchi ................. 348/364 |
| 7,339,649 | B2 * | 3/2008 | Imai et al. .................. 349/200 |
| 7,483,116 | B2 * | 1/2009 | Udaka ....................... 349/200 |

2007/0263150 A1 * 11/2007 Ohishi et al. ................ 349/128

FOREIGN PATENT DOCUMENTS

| JP | 55-142314 | 11/1980 |
|---|---|---|
| JP | 58-147711 | 9/1983 |
| JP | 58-154819 | 9/1983 |
| JP | 60-241031 | 11/1985 |
| JP | 63-019626 | 1/1988 |
| JP | 63-049736 | 3/1988 |

(Continued)

OTHER PUBLICATIONS

Office Action issued by the Japanese Patent Office on Mar. 29, 2007 for corresponding Japanese Application No. 01-239528.

*Primary Examiner*—Ngoc-Yen T Vu
(74) *Attorney, Agent, or Firm*—K&L Gates LLP

(57) ABSTRACT

A liquid crystal light control element, a lens barrel, and an imaging device, which are so designed as to adequately control the amount of light led to the imaging element at the time of photographing in a bright ambience are provided.

The lens barrel includes an optical system, a liquid crystal light control element, and an imaging element. The object image captured by the optical system reaches the imaging element through the liquid crystal light control element, which is composed of a first liquid crystal light control unit, a second liquid crystal light control unit, and a first and a second liquid crystal layers, which are placed on top of the other in their thickness direction.

11 Claims, 17 Drawing Sheets

FOREIGN PATENT DOCUMENTS

| | | |
|---|---|---|
| JP | 01-239528 | 9/1989 |
| JP | 02-091607 | 3/1990 |
| JP | 07-027983 | 1/1995 |
| JP | 07-072461 | 3/1995 |
| JP | 09-197429 | 7/1997 |
| JP | 2002082358 | 3/2002 |

* cited by examiner

LIQUID CRYSTAL LIGHT CONTROL ELEMENT, LENS BARREL, AND IMAGING DEVICE

CROSS REFERENCE TO RELATED APPLICATIONS

The present application claims priority to Japanese Patent Application No. 2004-059130 filed on Mar. 3, 2004, the disclosure of which is herein incorporated by reference.

BACKGROUND OF THE INVENTION

The present invention relates to a liquid crystal light control element, a lens barrel, and an imaging device.

The imaging device, such as digital camera and video camera, is provided with a lens barrel containing an optical system to lead the object image, an imaging device (such as CCD) aligned with the optical axis of the optical system, and a light control means for regulating the amount of light led to the imaging device, said light control means crosses the optical axis of the optical system.

The light control means is usually an iris diaphragm which mechanically adjusts the aperture. The iris diaphragm suffers the disadvantage of requiring iris blades and a mechanism to drive iris blades, which occupy a large space in the lens barrel. Therefore, the iris diaphragm is unfavorable to the size reduction of the lens barrel.

To tackle this problem, there has been proposed an imaging device provided with a liquid crystal light control element which does not need a large space. Japanese Patent Laid-open No. 2002-82358.

The conventional liquid crystal light control element, which is indicated by a reference numeral 16 in FIG. 4, has only one liquid crystal layer, which is indicated by a reference numeral 1614 in FIG. 4. The liquid crystal layer 1614 consists of a large number of rod-like liquid crystal molecules 1625, which are hermetically sealed in a container such that they incline while keeping their long axes parallel to each other. The angle of inclination (with respect to the thickness direction of the liquid crystal layer) varies in proportion to the voltage applied to the light control element 16.

The liquid crystal molecules 1615 permit more light to pass through as the angle of orientation of their long axes decreases with respect to the passage of light, resulting in an increased light transmittance. By contrast, the liquid crystal molecules 1615 permit less light to pass through as the angle of orientation of their long axes increases with respect to the passage of light, resulting in a decreased light transmittance.

The conventional light control element 16 with only one liquid crystal layer 1614 is limited in the amount of light that can be regulated. In other words, it is incapable of adequately regulating the amount of light to be led to the imaging device in an ambience with a plenty of light.

SUMMARY OF THE INVENTION

The present invention in an embodiment provides a liquid crystal light control element, which is capable of adequately regulating the amount of light to be led to the imaging device in an ambience with a plenty of light. It is another object of the present invention to provide a lens barrel and an imaging device, which are equipped with said liquid crystal light control element.

The present invention in an embodiment is directed to a liquid crystal light control element which includes a plurality of liquid crystal light control units, each having a liquid crystal layer held between transparent electrodes, which are placed on top of the other in the thickness direction of said liquid crystal layers, each of said liquid crystal light control units is so constructed as to control the amount of light passing in the thickness direction of said liquid crystal layers in response to the voltage applied to said transparent electrodes.

The present invention in an embodiment is directed also to a lens barrel which includes an optical system to lead an object image, an imaging element with an imaging plane placed across the optical axis of said optical system, and a liquid crystal light control element placed across said optical axis between said optical system and said imaging element, said liquid crystal light control element being composed of a plurality of liquid crystal light control units, each having a liquid crystal layer held between transparent electrodes, which are placed on top of the other in the thickness direction of said liquid crystal layers, each of said liquid crystal light control units is so constructed as to control the amount of light passing in the thickness direction of said liquid crystal layers in response to the voltage applied to said transparent electrodes.

The present invention in an embodiment is directed also to an imaging device which includes an optical system to lead an object image, an imaging element with an imaging plane placed across the optical axis of said optical system, and a liquid crystal light control element placed across said optical axis between said optical system and said imaging element, said liquid crystal light control element being composed of a plurality of liquid crystal light control units, each having a liquid crystal layer held between transparent electrodes, which are placed on top of the other in the thickness direction of said liquid crystal layers, each of said liquid crystal light control units is so constructed as to control the amount of light passing in the thickness direction of said liquid crystal layers in response to the voltage applied to said transparent electrodes.

According to the present invention in an embodiment, the liquid crystal light control unit is constructed as follows. A plurality of said liquid crystal light control units are composed of a first liquid crystal light control unit and a second liquid crystal light control unit which are placed on top of the other, said first liquid crystal light control unit having a first and a second transparent substrates extending parallel to each other a certain distance apart, a first and a second transparent electrodes formed on the opposing sides of the first and second transparent substrates, a first and a second alignment layers formed on the opposing sides of the first and second transparent electrodes, and a first liquid crystal layer sealed between the first and second alignment layers, said second liquid crystal light control unit having the second transparent substrate and a third transparent substrate extending parallel to each other a certain distance apart, a third and a fourth transparent electrodes formed on the opposing sides of the second and third transparent substrates, a third and a fourth alignment layers formed on the opposing sides of the third and fourth transparent electrodes, and a second liquid crystal layer sealed between the third and fourth alignment layers, said second transparent substrate having a first projecting part that projects from said first transparent substrate, said first projecting part having a first connecting terminal electrically connected to said first and second transparent electrodes, said third transparent electrode having a second projecting part that projects from said second transparent substrate, said second projecting part having a second connecting terminal electrically connected to the third and fourth transparent electrodes.

According to the present invention in an embodiment, the liquid crystal light control unit is constructed as follows. A plurality of said liquid crystal light control units are composed of a first liquid crystal light control unit and a second liquid crystal light control unit which are placed on top of the other, said first liquid crystal light control unit having a first and a second transparent substrates extending parallel to each other a certain distance apart, a first and a second transparent electrodes formed on the opposing sides of the first and second transparent substrates, a first and a second alignment layers formed on the opposing sides of the first and second transparent electrodes, and a first liquid crystal layer sealed between the first and second alignment layers, said second liquid crystal light control unit having the second transparent substrate and a third transparent substrate extending parallel to each other a certain distance apart, a third and a fourth transparent electrodes formed on the opposing sides of the second and third transparent substrates, a third and a fourth alignment layers formed on the opposing sides of the third and fourth transparent electrodes, and a second liquid crystal layer sealed between the third and fourth alignment layers, said first transparent substrate having a first projecting part that projects from said second transparent substrate, said first projecting part having a first connecting terminal electrically connected to said first and second transparent electrodes, said third transparent electrode having a second projecting part that projects from said second transparent substrate, and said second projecting part having a second connecting terminal electrically connected to the third and fourth transparent electrodes.

According to the present invention in an embodiment, the liquid crystal light control unit is constructed as follows. A plurality of said liquid crystal light control units are composed of a first liquid crystal light control unit and a second liquid crystal light control unit which are placed on top of the other, said first liquid crystal light control unit having a first and a second transparent substrates extending parallel to each other a certain distance apart, a first and a second transparent electrodes formed on the opposing sides of the first and second transparent substrates, a first and a second alignment layers formed on the opposing sides of the first and second transparent electrodes, and a first liquid crystal layer sealed between the first and second alignment layers, said second liquid crystal light control unit having the second transparent substrate and a third transparent substrate extending parallel to each other a certain distance apart, a third and a fourth transparent electrodes formed on the opposing sides of the second and third transparent substrates, a third and a fourth alignment layers formed on the opposing sides of the third and fourth transparent electrodes, and a second liquid crystal layer sealed between the third and fourth alignment layers, said first transparent substrate having a first projecting part that projects from said second transparent substrate, said first projecting part having a first connecting terminal electrically connected to said first and second transparent electrodes, said third transparent electrode having a second projecting part that projects from said second transparent substrate, and said second projecting part having a second connecting terminal electrically connected to the third and fourth transparent electrodes.

According to the present invention in an embodiment, said plurality of liquid crystal light control units are composed of a first liquid crystal light control unit and a second liquid crystal light control unit which are placed on top of the other, said first liquid crystal light control unit having a first and a second transparent substrates extending parallel to each other a certain distance apart, a first and a second transparent electrodes formed on the opposing sides of the first and second transparent substrates, a first and a second alignment layers formed on the opposing sides of the first and second transparent electrodes, and a first liquid crystal layer sealed between the first and second alignment layers, said second liquid crystal light control unit having the second transparent substrate and a third transparent substrate extending parallel to each other a certain distance apart, a third and a fourth transparent electrodes formed on the opposing sides of the second and third transparent substrates, a third and a fourth alignment layers formed on the opposing sides of the third and fourth transparent electrodes, and a second liquid crystal layer sealed between the third and fourth alignment layers, said second transparent substrate having a projecting part that projects from the third transparent substrate, said projecting part having a first connecting terminal electrically connected to said first and second transparent electrodes, and also having a second connecting terminal electrically connected to the third and fourth transparent electrodes.

Said projecting part in an embodiment has a surface facing said first transparent electrode and a surface facing said fourth transparent electrode, said first connecting terminal is formed on the surface facing said first transparent electrode, and said second connecting terminal is formed on the surface facing the fourth transparent electrode.

Said first and second transparent substrates in an embodiment assume a rectangular shape of approximately the same size, said second transparent substrate assumes a rectangular shape, with its short side being equal to the short side of said rectangular shape and its long side being larger than the long side of said rectangular shape, and said projecting part is constructed of that part of the second transparent substrate which projects from the short side of said first and third transparent substrates.

Said first transparent substrate assumes in an embodiment a discoid shape, said second transparent substrate assumes a discoid shape larger in diameter than said first transparent substrate, said third transparent substrate assumes a discoid shape smaller in diameter than said second transparent substrate, said first and third transparent substrates are coaxially arranged, said projecting part is formed at that part of said second transparent substrate which projects from said first and third transparent substrates, said first connecting terminal is formed on that surface of said projecting part which faces said first transparent substrate, and said second connecting terminal is formed on that surface of said projecting part which faces said third transparent substrate.

The liquid crystal light control element according to an embodiment of the present invention comprises a plurality of liquid crystal light control units, each having a liquid crystal layer held between transparent electrodes, which are placed on top of the other in the thickness direction of said liquid crystal layers, each of said liquid crystal light control units is so constructed as to control the amount of light passing in the thickness direction of said liquid crystal layers in response to the voltage applied to said transparent electrodes. This structure permits the imaging element to receive an adequately controlled amount of light to take pictures even in a bright ambience.

According to the present invention in an embodiment, the object of adequately controlling the amount of light led to the imaging element at the time of taking pictures in a bright ambience is achieved by placing a plurality of liquid crystal light control units on top of the other in the thickness direction of said liquid crystal layers.

Additional features and advantages of the present invention are described in, and will be apparent from, the following Detailed Description of the Invention and the figures.

DETAILED DESCRIPTION OF THE INVENTION

The present invention generally relates to a liquid crystal light control element, a lens barrel, and an imaging device.

EXAMPLE 1

Example 1 of the present invention according to an embodiment will be described below with reference to the accompanying drawings.

This example is concerned with the imaging device in which is incorporated the lens barrel of the present invention.

Figure 1:
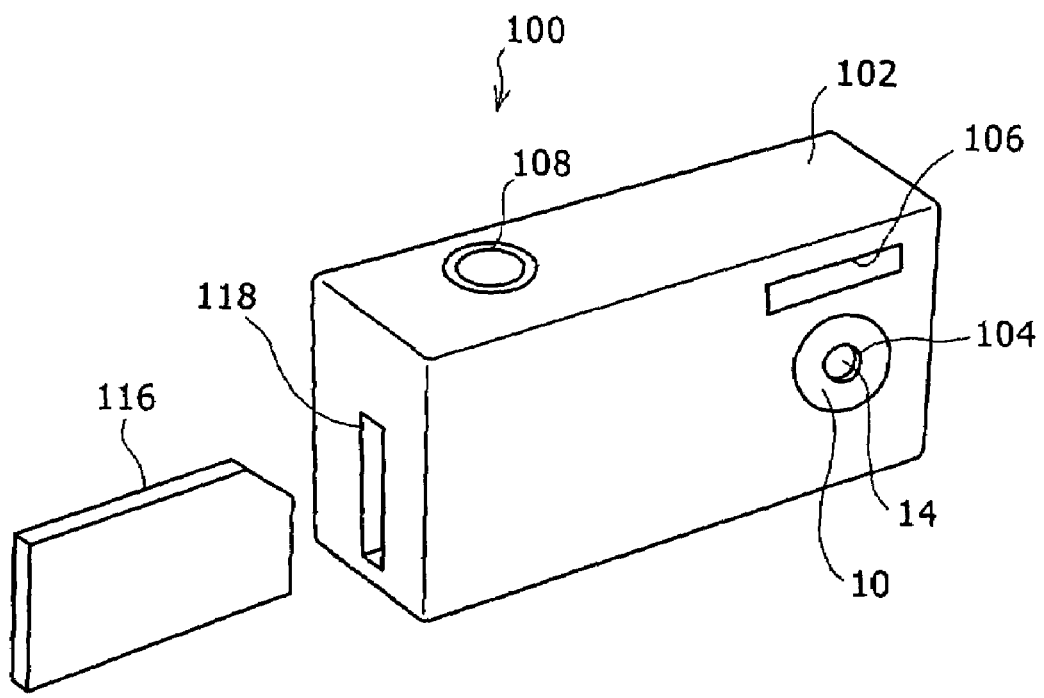
FIG. 1 is a front perspective view of the imaging device pertaining to Example 1.
Figure 2:
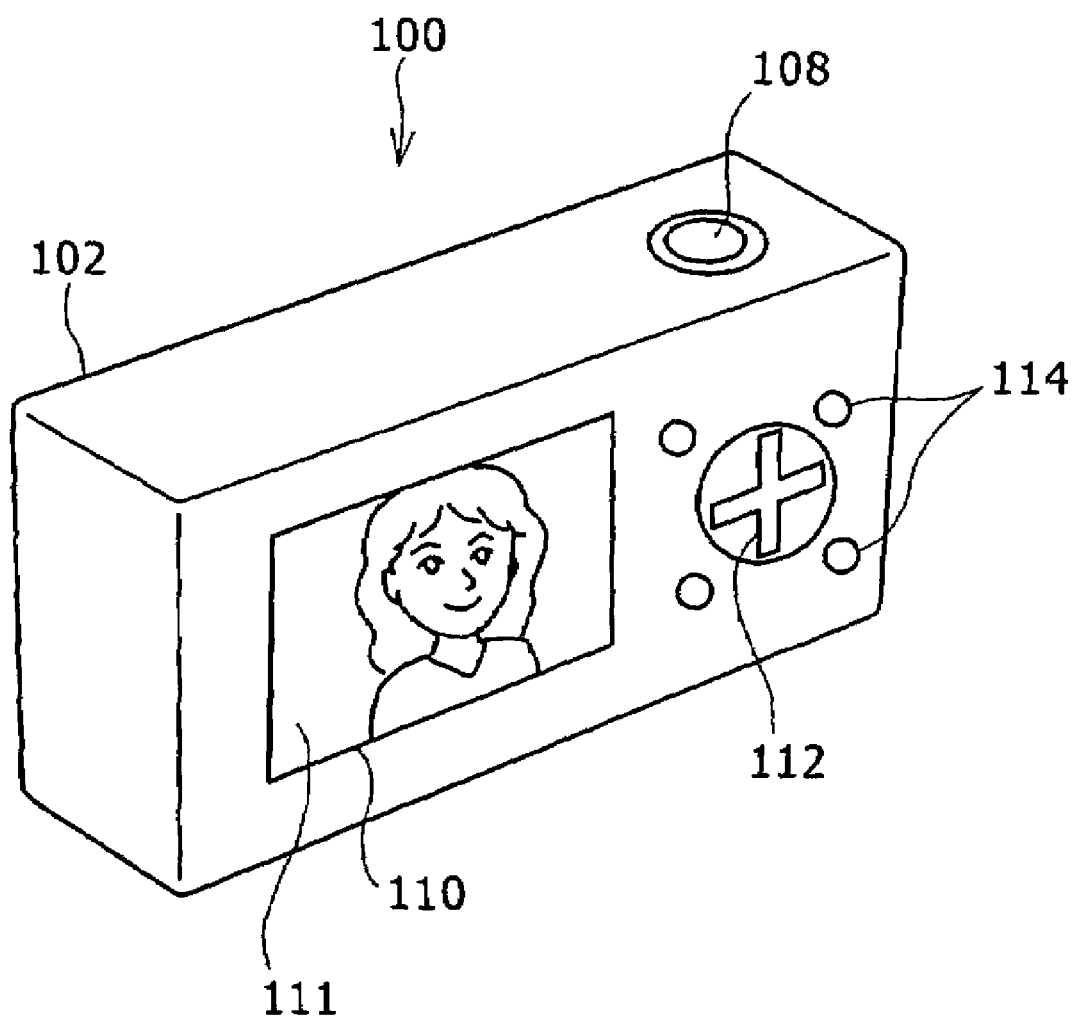
FIG. 2 is a rear perspective view of the imaging device pertaining to Example 1.
Figure 3:
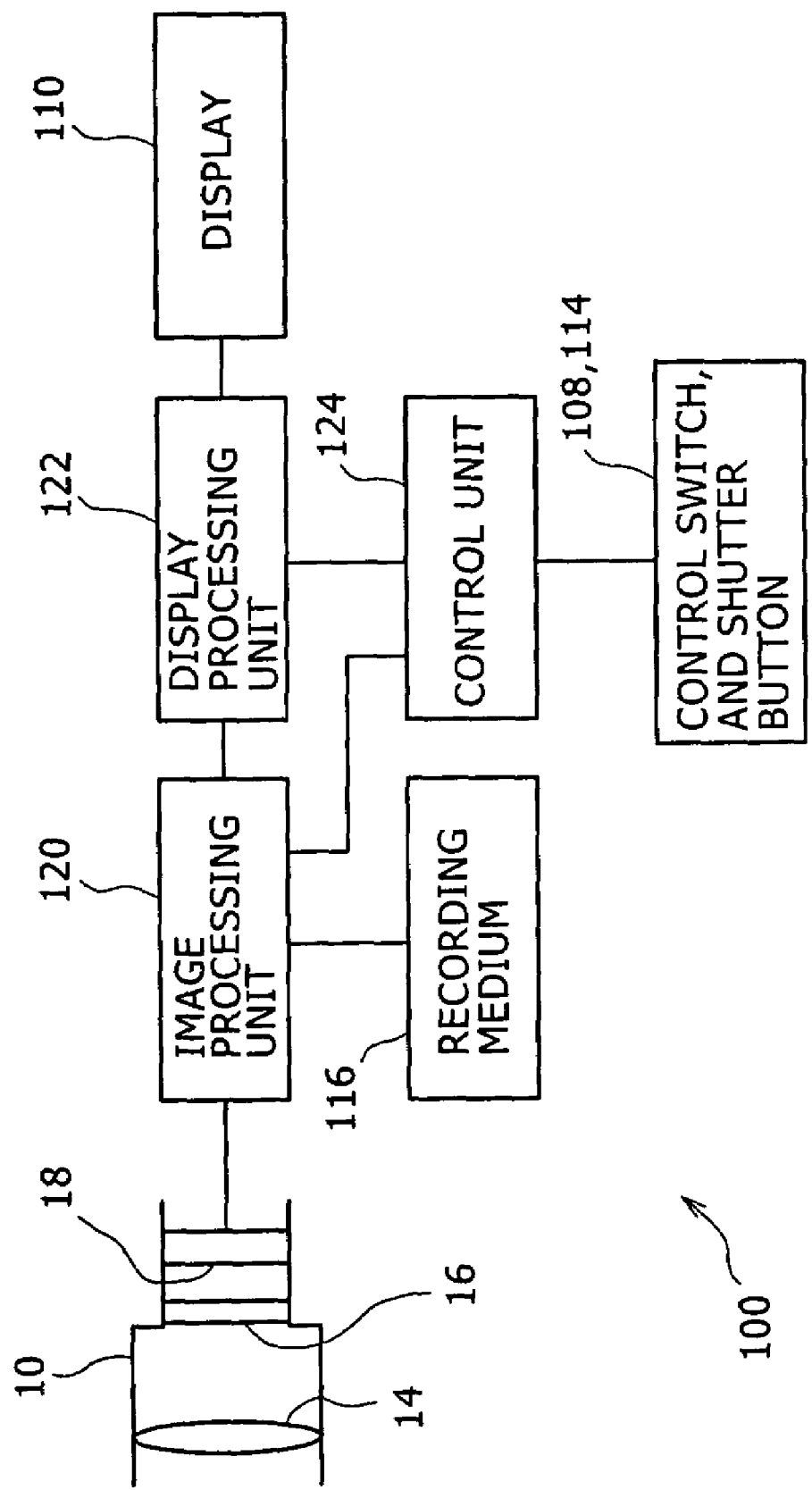
FIG. 3 is a block diagram showing the control system of the imaging device.
Figure 4:
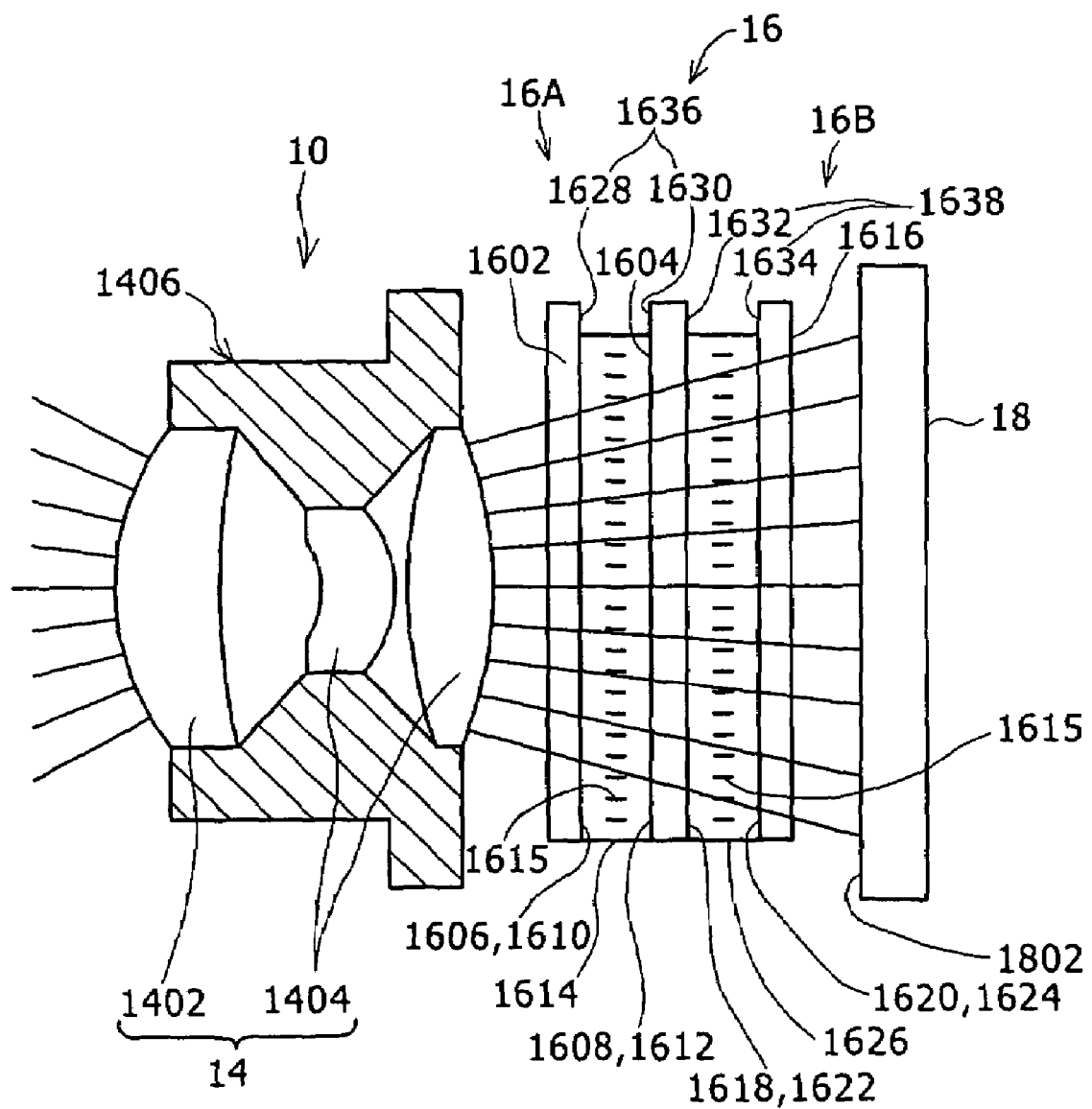
FIG. 4 is a schematic diagram showing the structure of the lens barrel.
Figure 5:
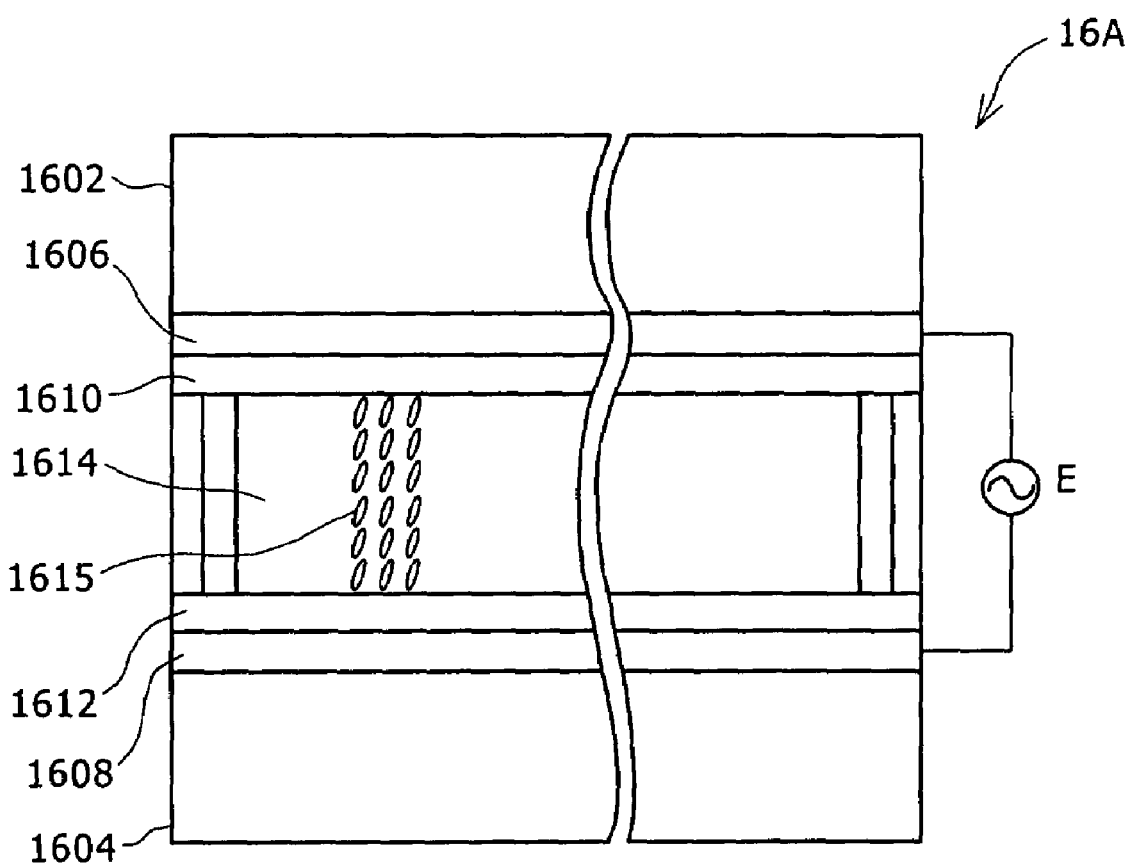
FIG. 5 is a diagram showing the structure of the first liquid crystal light control unit.
Figure 6:
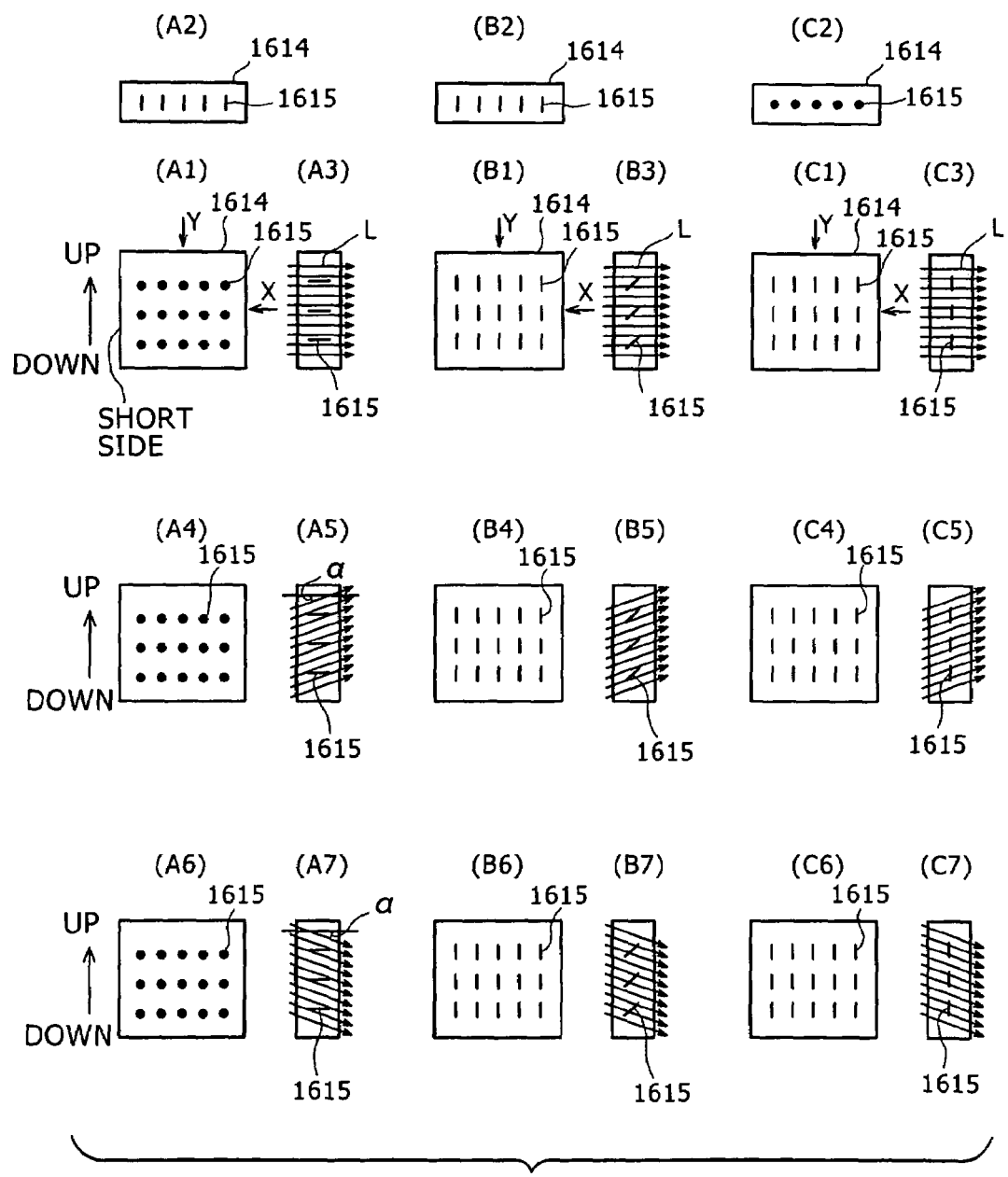
FIG. 6 is a diagram illustrating how the liquid crystal light control element 16 works.
Figure 7:
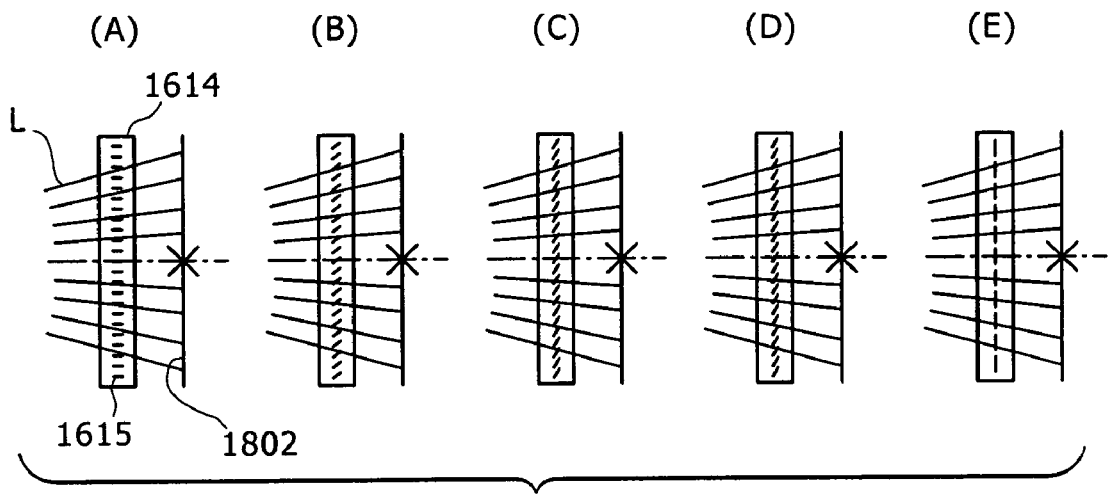
FIG. 7 is a diagram illustrating how the liquid crystal light control element 16 affects light transmission.
Figure 8:
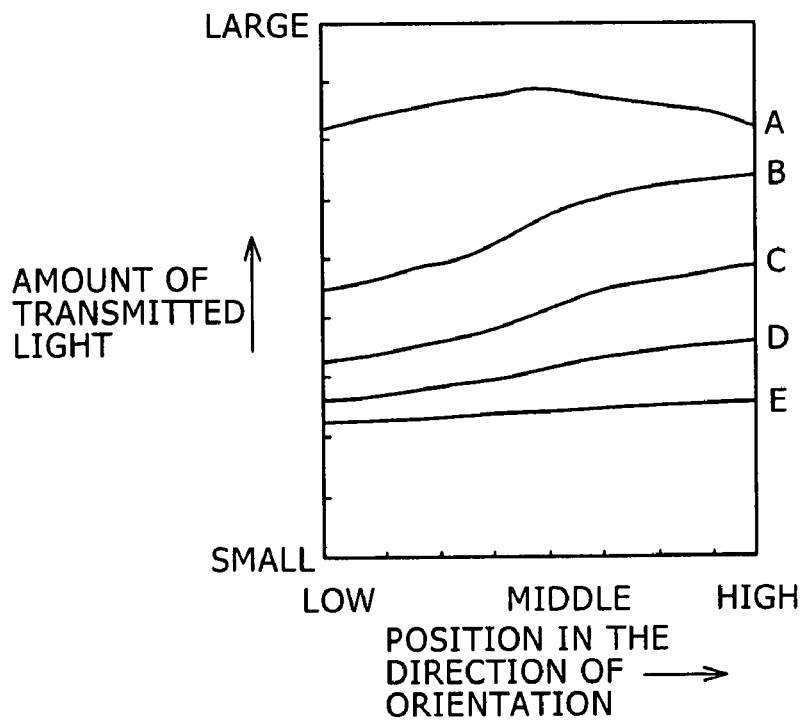
FIG. 8 is a graph illustrating the characteristics of light transmission in FIG. 7.
Figure 10A:
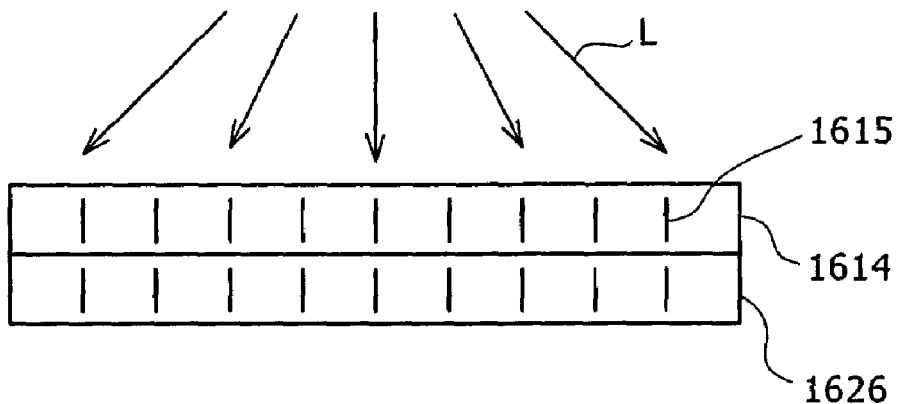
FIGS. 10A-10C are diagrams illustrating liquid crystal molecules 1615 inclining differently in the liquid crystal light control element 16.
Figure 10B:
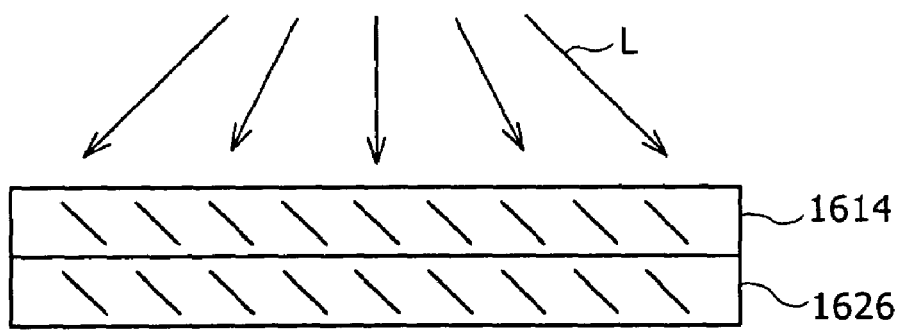
Figure 10C:
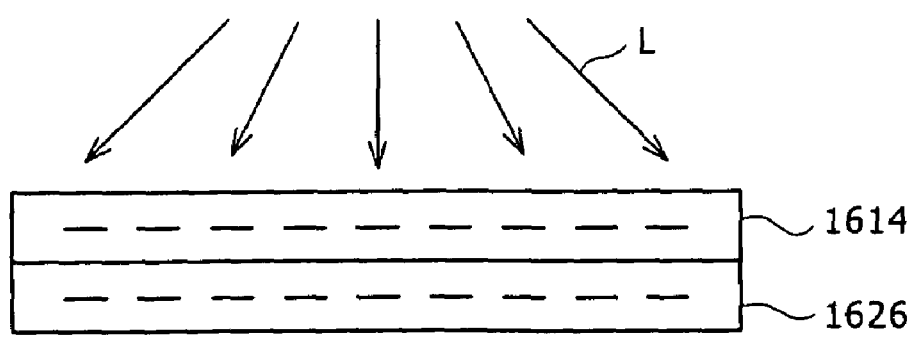
Figure 11A:
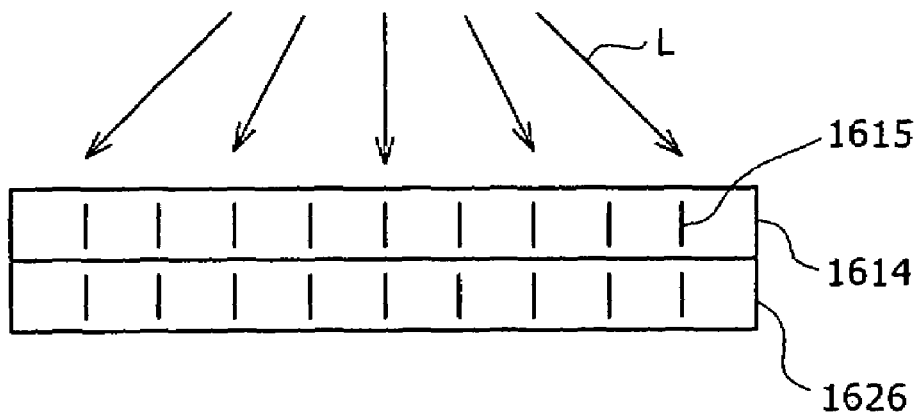
FIGS. 11A-11C are diagrams illustrating liquid crystal molecules 1615 inclining differently in the liquid crystal light control element 16.
Figure 11B:
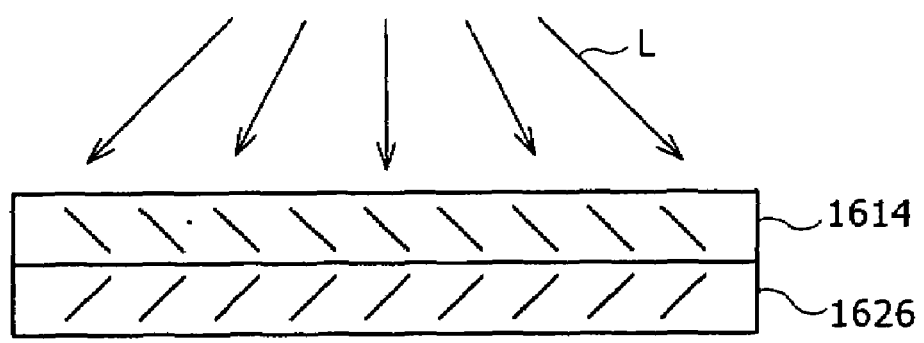
Figure 11C:
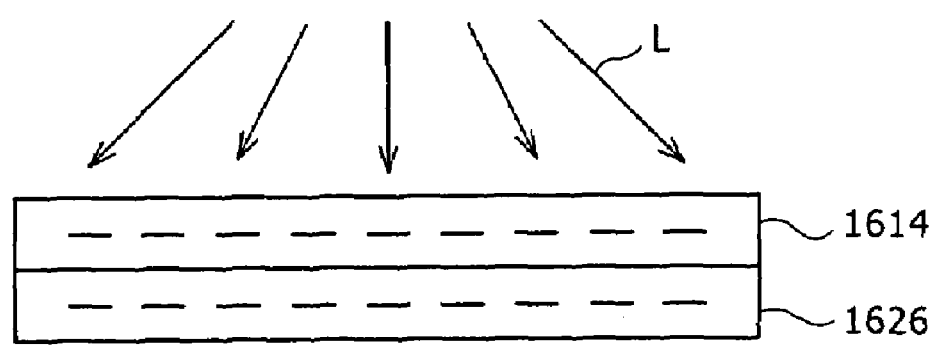

FIG. 1 is a front perspective view of the imaging device pertaining to Example 1. FIG. 2 is a rear perspective view of the imaging device pertaining to Example 1. FIG. 3 is a block diagram showing the control system of the imaging device. FIG. 4 is a schematic diagram showing the structure of the lens barrel. FIG. 5 is a diagram showing the structure of the first liquid crystal light control unit. FIG. 6 is a diagram illustrating how the liquid crystal light control element 16 works. FIG. 7 is a diagram illustrating how the liquid crystal light control element 16 affects light transmission. FIG. 8 is a graph illustrating the characteristics of light transmission in FIG. 7. FIG. 9 is a diagram illustrating the image plane in relation to the liquid crystal light control element 16. FIG. 10 is a diagram illustrating liquid crystal molecules 1615 inclining differently in the liquid crystal light control element 16. FIG. 11 is a diagram illustrating liquid crystal molecules 1615 inclining differently in the liquid crystal light control element 16.

The imaging device 100 shown in FIGS. 1 and 2 is a digital camera with a rectangular casing 102. Incidentally, the terms "left" and "right" used in this specification respectively denote the left side and right side of the imaging device 100 as viewed from its front. Also, the terms "front" and "rear" respectively denote that side of the imaging device close to the object and the imaging element as viewed in the direction of the optical axis of the optical system.

As shown in FIG. 1, the imaging device 100 has a lens window 104 at its front right side and a lens barrel 10 through the lens window 104.

Above the lens window 104 is a flash 106 to generate fill-in light.

At the upper left side of the casing 12 is a shutter button 108.

On the rear side of the casing 12 are a liquid crystal display 110 as well as a cross switch 112 and a few control buttons 114 for operations.

On the left side of the casing 12 is a memory holder 118 which detachably holds a memory card 116 (recording medium) to record static and/or dynamic images.

As shown in FIG. 3, the lens barrel 10 consists of an optical system 14 (to lead the object image), an imaging element 18 (with an image plane which crosses the optical axis of the optical system 14), and a light control element 16 (which is placed between the optical system 14 and the imaging element 18 such that it crosses the optical axis). Thus, the lens barrel 10 leads the object image captured by the optical system 14 to the rectangular image plane 1802 of the imaging element 18 through the liquid crystal light control element 16.

The image taken by the imaging element 18 is converted into image signals to be output to the image processing unit 120, which creates the image data of the static and/or dynamic image according to the image signals. The image data is stored in the memory card 116 and processed by the display processing unit 122 for display on the display 110.

In addition, the imaging device 100 has a control unit 124 (composed of CPU etc.) which controls the image processing unit 120 and the display processing unit 122 as the shutter button 108, the cross switch 112, and the control buttons are operated.

As shown in FIG. 4, the optical system 14 is comprised of front lenses 1402 and rear lenses 1404 which are held in the lens barrel 1406.

A description is given below of the liquid crystal light control element 16.

As shown in FIG. 4, the liquid crystal light control element 16 comprises a first liquid crystal light control element 16A and a second liquid crystal light control element 16B which are placed on top of the other. It takes on a rectangular shape as a whole.

As shown in FIG. 5, the first liquid crystal light control element 16A is made up of the following components.

A first and second transparent substrates 1602 and 1604 which extend parallel to each other a certain distance apart.

A first and second transparent electrodes 1606 and 1608 which are formed on the opposing surfaces of the transparent substrates.

A first and second alignment layers 1610 and 1612 which are formed on the opposing surfaces of the transparent electrodes.

A first liquid crystal layer 1614 which is sealed between the alignment layers and which contains rod-like liquid crystal molecules.

The second liquid crystal light control unit 16B is also made up of the following components in the same way as in the first liquid crystal control unit 16A.

A second and third transparent substrates 1604 and 1616 which extend parallel to each other a certain distance apart.

A third and fourth transparent electrodes 1618 and 1620 which are formed on the opposing surfaces of the transparent substrates.

A third and fourth alignment layers 1622 and 1624 which are formed on the opposing surfaces of the transparent electrodes.

A second liquid crystal layer 1626 which is sealed between the alignment layers and which contains rod-like liquid crystal molecules 1615.

Thus, the second transparent substrate 1604 at the middle of the first and second liquid crystal light control elements 16A and 16B serves for both of them.

The first transparent substrate 1602 has a first connecting terminal 1628 leading to the first transparent electrode 1606. The second transparent substrate 1604 has a second connecting terminal 1630 leading to the second transparent electrode 1608 and a third connecting terminal 1632 leading to the third transparent electrode 1618. The third transparent substrate 1616 has a fourth connecting terminal 1634 leading to the fourth transparent electrode 1620. In this example, the first and second connecting terminals 1618 and 1630 constitute the first connecting terminal unit 1636 which is defined in the claim, and the third and fourth terminals 1632 and 1634 constitute the second connecting terminal unit 1638 defined in the claim.

As shown in FIG. 5, a voltage E to drive the liquid crystal is applied across the first and second connecting terminals 1628 and 1630. Similarly, a driving voltage E is applied across the third and fourth connecting terminals 1632 and 1634.

The first and second liquid crystal layers 1614 and 1626 in the first and second liquid crystal light control units 16A and 16B are of guest-host-type cell structure containing a host material and a guest material. The host material is composed of liquid crystal molecules 1615 and the guest material is composed of dichroic dye molecules.

Thus, the first liquid crystal layer 1614 controls the amount of light passing through it as the liquid molecules 1615 change in the direction of orientation of their long axis in response to the voltage applied across the first and second transparent electrodes 1606 and 1608. The direction of orientation inclines with respect to the direction determined by the first and second alignment layers 1610 and 1612. The change in angle of inclination achieves the desired control.

Similarly, the second liquid crystal layer 1626 controls the amount of light passing through it as the liquid molecules 1615 change in the direction of orientation of their long axis in response to the voltage applied across the third and fourth transparent electrodes 1622 and 1624. The direction of orientation inclines with respect to the direction determined by the third and fourth alignment layers 1622 and 1624. The change in angle of inclination achieves the desired control.

A description is given below of the action of the liquid crystal light control element 16.

FIG. 6 illustrates the relation between the inclination of the long axis of liquid crystal molecules in the liquid crystal light control element 16 and the amount of light L passing through the liquid crystal light control element 16. Incidentally, FIG. 6 shows only the first liquid crystal layer 16A for brevity.

The relation between the inclination of liquid crystal molecules 1615 and the amount of light L passing through the liquid crystal light control element 16 is similar to that between the slats of a blind and the amount of light passing through the blind. In this example, the first liquid crystal light control element 16A is constructed such that the liquid crystal molecules orient in the plane approximately parallel to the short side of the image plane of the imaging element 18.

FIGS. 6(A1), 6(A2), and 6(A3) show how the liquid crystal molecules behave when the first liquid crystal light control element 16A is free of drive voltage E. FIG. 6(A1) is a diagram as viewed from the front. FIG. 6(A2) is a diagram as viewed in direction Y which is parallel to the plane in which liquid crystal molecules 1615 orient. FIG. 6(A3) is a diagram as viewed in direction X which is perpendicular to direction Y.

It is to be noted that when the first liquid crystal light control element 16A is free of driving voltage E, liquid crystal molecules 1615 rest, with their long axis not inclined with respect to the thickness direction of the first liquid crystal light control element 16A. With liquid crystal molecules 1615 orienting in such a direction, the first liquid crystal light control element 16A permits the maximum transmission of the incident rays L parallel to the thickness direction of the first liquid crystal layer 1614.

FIGS. 6(B1), 6(B2), and 6(B3), which are similar to FIGS. 6(A1), 6(A2), and 6(A3), show how the liquid crystal molecules behave when the first liquid crystal light control element 16A is excited at an intermediate drive voltage E.

It is to be noted that when the first liquid crystal light control element 16A is excited at an intermediate driving voltage E, liquid crystal molecules 1615 orient in such a way that their long axis inclines about 45° with respect to the thickness direction of the first liquid crystal light control element 16A. With liquid crystal molecules 1615 orienting in such a direction, the first liquid crystal light control element 16A permits the intermediate transmission of the incident rays L parallel to the thickness direction of the first liquid crystal layer 1614.

FIGS. 6(C1), 6(C2), and 6(C3), which are similar to FIGS. 6(A1), 6(A2), and 6(A3), show how the liquid crystal molecules behave when the first liquid crystal light control element 16A is excited at a maximum drive voltage E.

It is to be noted that when the first liquid crystal light control element 16A is excited at a maximum driving voltage E, liquid crystal molecules 1615 orient in such a way that their long axis are perpendicular to the thickness direction of the first liquid crystal light control element 16A. With liquid crystal molecules 1615 orienting in such a direction, the first liquid crystal light control element 16A minimizes the transmission of the incident rays L parallel to the thickness direction of the first liquid crystal layer 1614.

The liquid crystal light control element 16 is made up of the first and second liquid crystal light control elements 16A and 16B, or it has the first and second liquid crystal layers 1614 and 1626. This dual-layer structure permits a broad range of control over the light transmitting in their thickness direction. In other words, the liquid crystal light control element 16 as a whole produces the total transmittance which is the product of the transmittance of the first liquid crystal light control element 16A and the transmittance of the second liquid crystal light control element 16B. This means that the liquid crystal light control element 16 can reduce the transmittance to a very low level, and hence it permits the imaging element 18 to operate adequately even in a very bright ambience.

According to an embodiment of the present invention, the optical system 14 may be so designed as to reduce the length of the front lenses 1402 and rear lenses 1404 in the direction of the optical axis and to reduce the outside diameter and length of the barrel 1406, thereby reducing the size of the optical system 14. This optical design eliminates the drawback that the light passing through the optical system 14 gradually diverges from the optical axis as it approaches the imaging element 18, or the drawback that the direction of the light L inclines with respect to the thickness direction of the first liquid crystal layer 1614.

The following description is given on the assumption that the liquid crystal molecules 1615 orient such that the direction of their long axis inclines 0°, 45°, and 90° with respect to the thickness direction of the first liquid crystal layer 1614. Incidentally, the direction Y of orientation is indicated by "up" and "down" as shown in FIG. 6.

FIGS. 6(A4), 6(A5), 6(B4), 6(B5), 6(C4), and 6(C5) show a situation in which the direction of the light L inclines upward an angle of a with respect to the thickness direction of the first liquid crystal layer 1614. As far as the angle of orientation of the liquid crystal molecules 1615 is concerned, FIGS. 6(A4) and 6(A5) are equivalent to FIGS. 6(A1) and 6(A3), FIGS. 6(B4) and 6(B5) are equivalent to FIGS. 6(B1) and 6(B3), and FIGS. 6(C4) and 6(C5) are equivalent to FIGS. 6(C1) and 6(C3).

By contrast, FIGS. 6(A6), 6(A7), 6(B6), 6(B7), 6(C6), and 6(C7) show a situation in which the direction of the light L inclines downward an angle of α with respect to the thickness direction of the first liquid crystal layer 1614. As far as the angle of orientation of the liquid crystal molecules 1615 is concerned, FIGS. 6(A6) and 6(A7) are equivalent to FIGS. 6(A1) and 6(A3), FIGS. 6(B6) and 6(B7) are equivalent to FIGS. 6(B1) and 6(B3), and FIGS. 6(C6) and 6(C7) are equivalent to FIGS. 6(C1) and 6(C3).

It is noted from these figures that even though the direction of orientation of the liquid crystal molecules 1615 remains the same with respect to the thickness direction of the first liquid crystal layer 1614, the direction of the light L changes with respect to the direction of orientation of the liquid crystal molecules 1615 if the direction of the light L changes with respect to the thickness direction of the first liquid crystal layer 1614.

As mentioned above, the light L emerging from the optical system 14 gradually diverges from the optical axis as it approaches the imaging element 18, and consequently the angle of the light L with respect to the thickness direction of the first liquid crystal layer 1614 changes depending on the position in the first liquid crystal light control unit 16A and the amount of the light L passing through the first liquid crystal light control element 16A also changes depending on the position in the first liquid crystal light control unit 16A.

This will be described below in more detail. FIGS. 7(A) to 7(E) illustrate that the direction of orientation of the liquid crystal molecules 1615 gradually increases (from 0° to 90°) with respect to the thickness direction of the first liquid crystal layer 1614. For the sake of brevity, FIG. 7 only shows the first liquid crystal layer 16A.

FIG. 8 is a graph in which the amount of the light L passing through the first liquid crystal light control element 16A (on the ordinate) is plotted against the position in the direction (Y) of orientation in the first liquid crystal light control element 16A (on the abscissa). Symbols A to E in FIG. 8 correspond to those in FIG. 6.

It is noted from FIG. 8 that the amount of the light passing through the first liquid crystal light control element 16A varies depending on the position in the direction (Y) of orientation in the first liquid crystal light control element 16A. It is further noted that the amount of the light passing through the first liquid crystal light control element 16A increases or decreases monotonously (steplessly or continuously) depending on the position in the direction (Y) of orientation in the first liquid crystal light control element 16A, except in the case where the direction of orientation of the liquid crystal molecules 1615 is 0°.

Here, it is assumed that the same direction of orientation is established by the first and second alignment layers 1610 and 1612 of the first liquid crystal light control element 16A and the third and fourth alignment layers 1622 and 1624 of the second liquid crystal light control element 16B. In other words, it is assumed as shown in FIG. 10 that there is no difference between the angle of orientation of the liquid crystal molecules 1615 in the first liquid crystal layer 1614 with respect to its thickness direction and the angle of orientation of the liquid crystal molecules 1615 in the second liquid crystal layer 1626 with respect to its thickness direction.

Now, the following discussion is about taking a picture of a uniformly bright object in such a state that the orientation of the liquid crystal molecules 1615 in the first and second liquid crystal light control elements 16A and 16B takes place in any one direction shown in FIGS. 7(B) to 7(E). In other words, the first liquid crystal control element 16A receives uniformly bright light from the optical system 14.

Figure 9A:
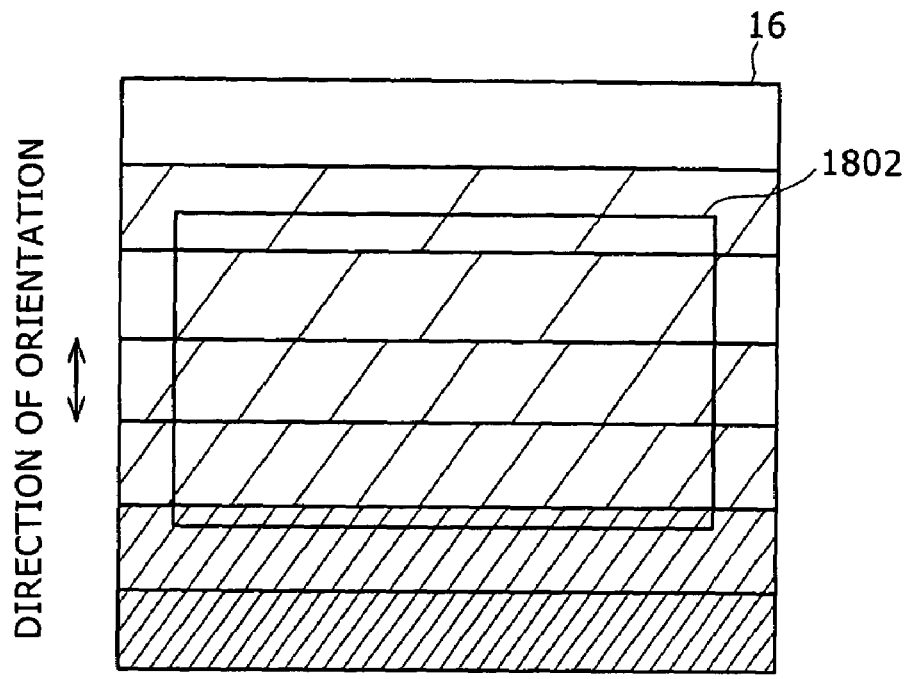
FIGS. 9A and 9B are diagrams illustrating the image plane in relation to the liquid crystal light control element 16.
Figure 9B:
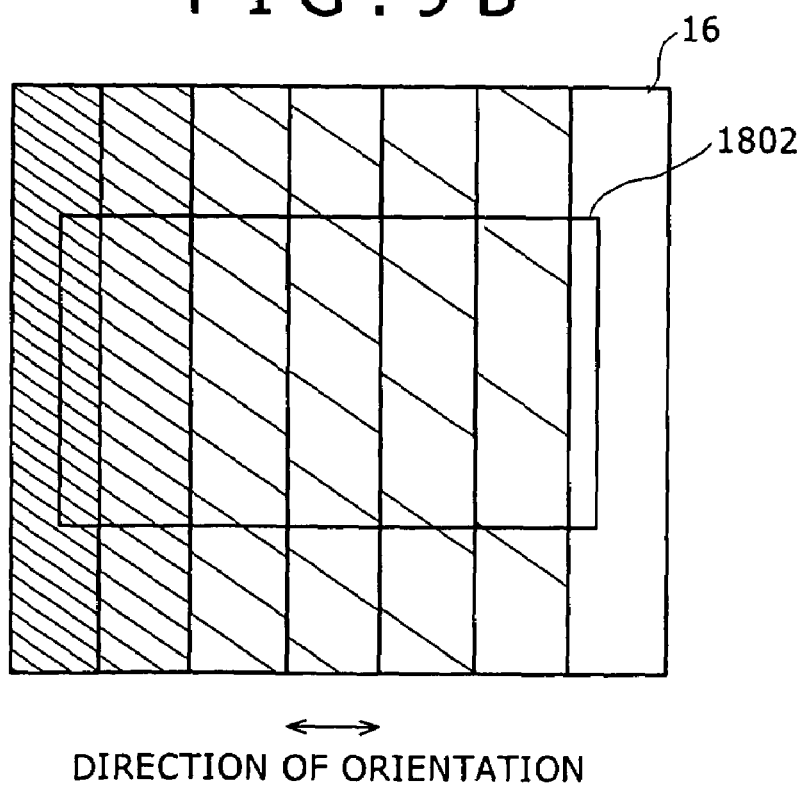

FIG. 9 shows the relative position of the imaging plane 1802 with respect to the first and second liquid crystal light control elements 16A and 16B. FIG. 9(A) shows a situation in which the direction of orientation in the first and second liquid crystal light control elements 16A and 16B is parallel to the short side of the imaging plane 1802. FIG. 9(B) shows a situation in which the direction of orientation in the first and second liquid crystal light control elements 16A and 16B is parallel to the long side of the imaging plane 1802.

Hatching in FIG. 9 shows the magnitude of the amount of light passing through the first and second liquid crystal light control elements 16A and 16B. The thinner the hatching, the larger the amount of light, and the thicker the hatching, the smaller the amount of light. The boundary between adjacent hatching areas is a hypothetical one for explanation.

In both FIGS. 9(A) and 9(B), the amount of transmitted light changes in the direction of the short side or long side of the imaging plane 1802. The variation in the amount of transmitted light adversely affects the image formed on the imaging element 18, giving rise to an unnatural image.

This trouble is avoided by forming the alignment layers in such a way that the first and second alignment layers 1610 and 1612 in the first liquid crystal light control element 16A establish the direction of orientation which is symmetrical to that established by the third and fourth alignment layers 1622 and 1624 in the second liquid crystal light control element 16B.

As shown in FIG. 11, the result of this arrangement of alignment layers is that the long axis of the liquid crystal molecules 1615 in the first liquid crystal layer 1614 inclines symmetrically with the long axis of the liquid crystal molecules 1615 in the second liquid crystal layer 1626. Thus, the change in transmitted light through the first liquid crystal layer 1614 cancels the change in transmitted light through the second liquid crystal layer 1626. This offers the advantage that the lens barrel and the imaging device can be reduced in size without variation in the amount of transmitted light through the liquid crystal light control element 16, even in the case where the optical system 14 is designed for size reduction in such a way that the light passing through the optical system 14 gradually diverges from the optical axis as it approaches the imaging element 18.

A detailed description is given below of the structure of the liquid crystal light control element 16.

Figure 12:
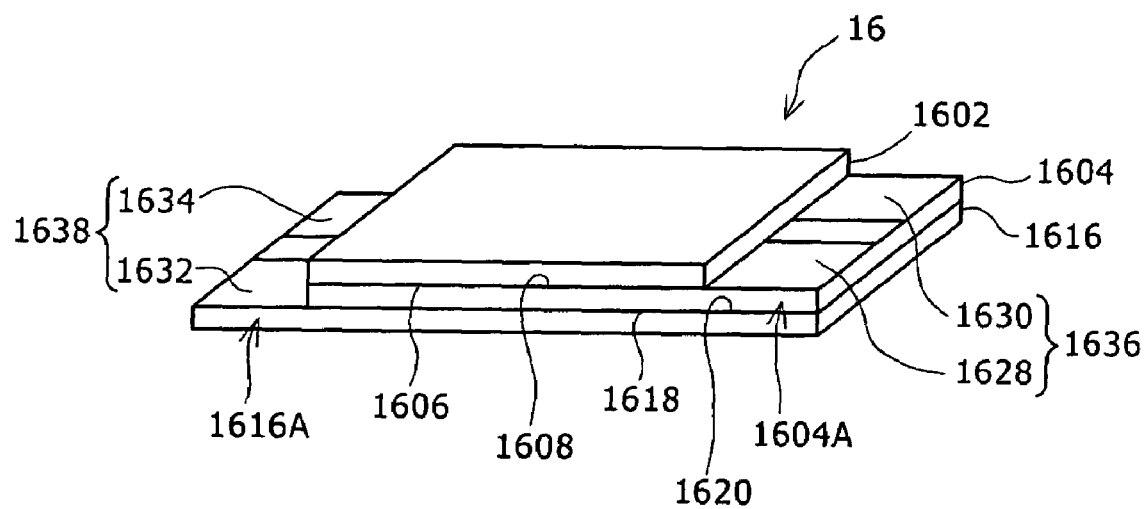
FIG. 12 is a perspective view showing the structure of the liquid crystal light control element 16.
Figure 13:
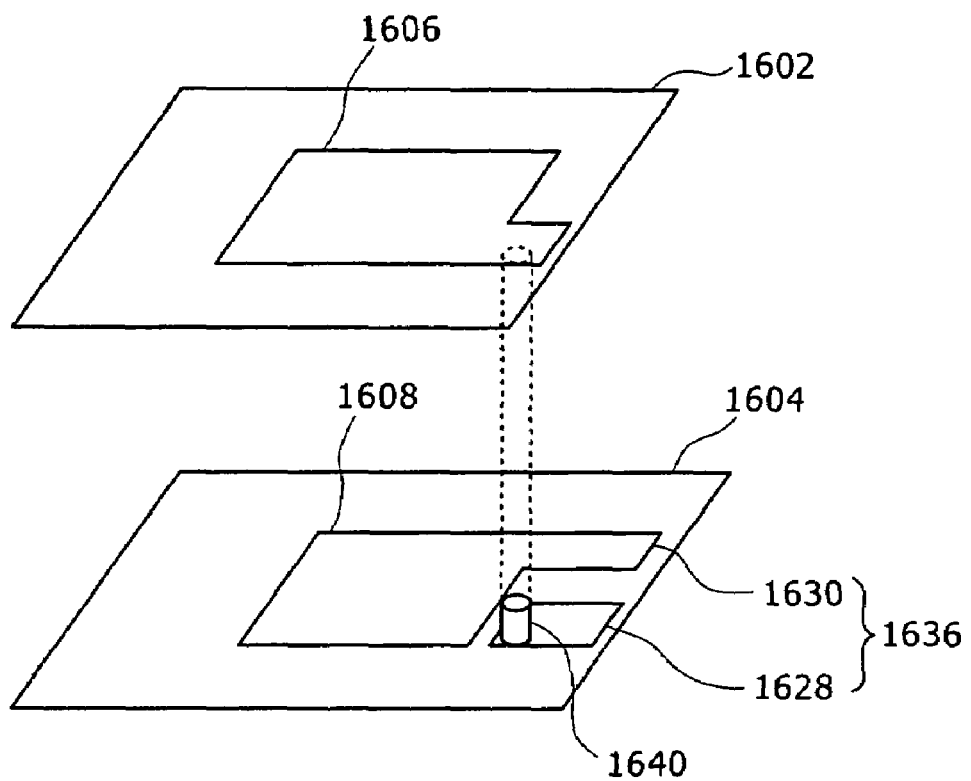
FIG. 13 is a diagram illustrating the structure of the electrode of the liquid crystal light control element 16.

FIG. 12 is a perspective view showing the structure of the liquid crystal light control element 16. FIG. 13 is a diagram illustrating the structure of the electrode of the liquid crystal light control element 16. Incidentally, those figures that follow FIG. 12 do not show the liquid crystal layers and alignment layers for the sake of brevity.

As shown in FIG. 12, the first transparent substrate 1602 takes on a rectangular shape. The second transparent substrate 1604 also takes on a rectangular shape, with its short side equal to that of the first rectangle and its long side larger than that of the first rectangle. The third transparent substrate 1616 also takes on a rectangular shape, with its short side equal to that of the second rectangle and its long side larger than that of the second rectangle.

The first and second transparent substrates 1602 and 1604 hold therein the first liquid crystal layer and the first and second alignment layers. They are bonded together such that one of the short sides and the long side of the first transparent substrate 1602 coincide with the short side and long side of the second transparent substrate 1604.

The second transparent substrate 1604 has a first projecting part 1604A that projects from the short side of the first transparent substrate 1602.

The second and third transparent substrates 1604 and 1616 hold therein the second liquid crystal layer and the third and fourth alignment layers. They are bonded together such that one of the short sides and the long side of the second transparent substrate 1604 coincide with one of the short sides and the long side of the third transparent substrate 1616.

The third transparent substrate 1616 has a second projecting part 1616A that projects from the other short side of the first transparent substrate 1602. The first projecting part 1604A and the second projecting part 1616A are positioned at both ends of the long side of the first transparent substrate 1602.

The first projecting part 1604A has two surfaces, one facing the first transparent electrode 1606 and the other facing the fourth transparent electrode 1620. The first connecting terminal 1636 faces the first transparent electrode 1606.

The second projecting part 1616A has two surfaces, one facing the third transparent electrode 1618 and the other facing the opposite side. The second connecting terminal 1638 faces the third transparent electrode 1618.

Therefore, the first connecting terminal 1636 and second connecting terminal 1638 face each other in the thickness direction of the first and second liquid crystal layers.

As shown in FIGS. 4 and 13, the first connecting terminal 1636 is made up of the first connecting terminal 1628 and the second connecting terminal 1630, which are formed on the second transparent substrate 1604. The first connecting terminal 1628 is electrically connected to the first transparent electrode 1606 through the conducting material 1640 which extends in the thickness direction of the first liquid crystal layer 1614 of the first liquid crystal light control element 16A. The second connecting terminal 1630 is electrically connected to the second transparent electrode 1608 on the second transparent substrate 1604.

The second connecting terminal 1638 is also constructed in the same way as the first connecting terminal 1636. That is, the second connecting terminal 1638 is made up of the third connecting terminal 1632 and the fourth connecting terminal 1634, which are formed on the third transparent substrate 1616. The third connecting terminal 1632 is electrically connected to the third transparent electrode 1616 through the conducting material which extends in the thickness direction of the second liquid crystal layer 1626 of the second liquid crystal light control element 16B. The fourth connecting terminal 1634 is electrically connected to the fourth transparent electrode 1620 on the third transparent substrate 1616.

As mentioned above, the first connecting terminal 1636 on the first projecting part 1604A and the second connecting terminal 1638 on the second projecting part 1616A face each other in the thickness direction of the first and second liquid crystal layers (or the thickness direction of the first and second liquid crystal light control elements 16A and 16B). This structure is desirable to build the liquid crystal light control element 16 and the conducting part into the lens barrel 10 easily and to reduce the entire size of the imaging device, because conducting material can be brought into contact with the first and second connecting terminals 1636 and 1638 in the same direction in the case where conducting materials are brought into contact with the first and second connecting terminals 1636 and 1638 from the outside of the liquid crystal light control element 16 for supply of driving voltage E to the first and second terminals 1636 and 1638.

EXAMPLE 2

Example 2 differs from Example 1 in the length of the first, second, and third transparent substrates 1602, 1604, and 1616.

Figure 14:
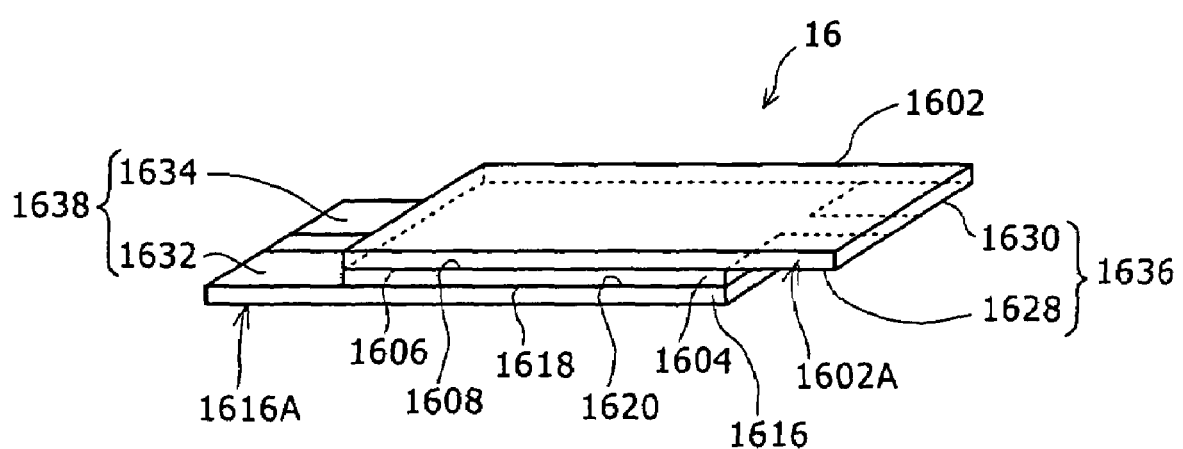
FIG. 14 is a perspective view showing the structure of the liquid crystal light control element 16 in Example 2.

FIG. 14 is a perspective view showing the structure of the liquid crystal light control element 16 in Example 2. In the following examples, the same parts as those in Example 1 are given the same symbols and their description is omitted.

As shown in FIG. 14, the first transparent substrate 1602 assumes a rectangular shape. The second transparent substrate 1604 also assumes a rectangular shape, with its short side equal to that of said rectangle and its long side smaller than that of said rectangle. The third transparent substrate 1616 also assumes a rectangular shape, with its short side equal to that of the second substrate 1604 and its long side larger than that of the second substrate 1604.

The first and second transparent substrates 1602 and 1604 hold therein the first liquid crystal layer and the first and second alignment layers. They are bonded together such that one of the short sides of the first transparent substrate 1602 coincides with one of the short sides of the second transparent substrate 1604 and the long side of the first transparent substrate 1602 coincides with the long side of the second transparent substrate 1604.

The first transparent substrate 1602 has a first projecting part 1602A that projects from the other short side of the second transparent substrate 1604.

The second and third transparent substrates 1604 and 1616 hold therein the second liquid crystal layer and the third and fourth alignment layers. They are bonded together such that one of the short sides and the long side of the second transparent substrate 1604 coincide respectively with one of the short sides and the long side of the third transparent substrate 1616.

The third transparent substrate 1616 has a second projecting part 1616A that projects from the other short side of the second transparent substrate 1602. The first projecting part 1604A and the second projecting part 1616A are positioned at both ends of the long side of the first transparent substrate 1602.

The first projecting part 1604A has two surfaces, one facing the second transparent electrode 1608 and the other facing the opposite side. The first connecting terminal 1636 faces the second transparent electrode 1608.

The second projecting part 1616A has two surfaces, one facing the third transparent electrode 1618 and the other facing the opposite side. The second connecting terminal 1638 faces the third transparent electrode 1618.

Therefore, the first connecting terminal 1636 and second connecting terminal 1638 face each other in the thickness direction of the first and second liquid crystal layers.

As shown in FIGS. 4 and 14, the first connecting terminal 1636 is made up of the first connecting terminal 1628 and the second connecting terminal 1630. The first connecting terminal 1628 is electrically connected to the first transparent electrode 1606 on the first transparent substrate 1602. The second connecting terminal 1630 is electrically connected to the second transparent electrode 1608 on the first transparent substrate 1602 through the conducting material (not shown) that extends in the thickness direction of the first liquid crystal layer 1614 of the first liquid crystal light control element 16A.

The second connecting terminal 1638 is also constructed in the same way as the first connecting terminal 1636. That is, the second connecting terminal 1638 is made up of the third connecting terminal 1632 and the fourth connecting terminal 1620, which are formed on the third transparent substrate 1616. The third connecting terminal 1632 is electrically connected to the third transparent electrode 1616 through the conducting material which extends in the thickness direction of the second liquid crystal layer 1626 of the second liquid crystal light control element 16B. The fourth connecting terminal 1634 is electrically connected to the fourth transparent electrode 1620 on the third transparent substrate 1616.

As mentioned above, the first connecting terminal 1636 on the first projecting part 1602A and the second connecting terminal 1638 on the second projecting part 1616A face each other in the thickness direction of the first and second liquid crystal layers (or the thickness direction of the first and second liquid crystal light control elements 16A and 16B). This structure is desirable to build the liquid crystal light control element 16 and the conducting part into the lens barrel 10 easily and to reduce the entire size of the imaging device, because conducting material can be brought into contact with the first and second connecting terminals 1636 and 1638 in the opposite direction in the case where conducting materials are brought into contact with the first and second connecting terminals 1636 and 1638 from the outside of the liquid crystal light control element 16 for supply of driving voltage E to the first and second terminals 1636 and 1638, in which case the conducting materials are directed opposite to each other.

EXAMPLE 3

Example 3 differs from Example 1 in the length of the first, second, and third transparent substrates 1602, 1604, and 1616.

Figure 15:
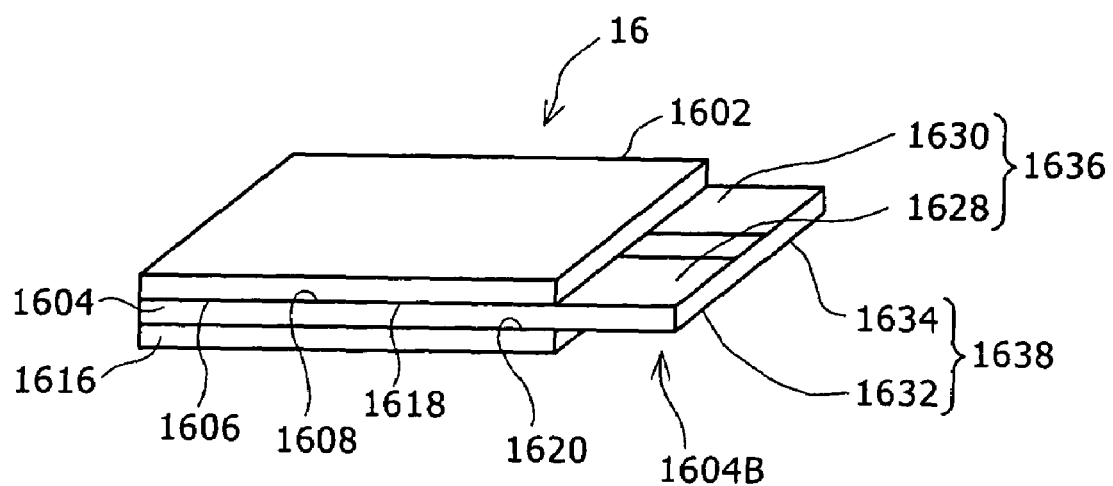
FIG. 15 is a perspective view showing the structure of the liquid crystal light control element 16 in Example 3.

FIG. 15 is a perspective view showing the structure of the liquid crystal light control element 16 in Example 3.

As shown in FIG. 15, the first transparent substrate 1602 and the third transparent substrate 1616 assumes a rectangular shape of the same size. The second transparent substrate 1604 has the same short side as that of said rectangle and a larger long side than that of said rectangle.

The first and second transparent substrates 1602 and 1604 hold therein the first liquid crystal layer and the first and second alignment layers. They are bonded together such that one of the short sides of the first transparent substrate 1602 coincides with one of the short sides of the second transparent substrate 1604 and the long side of the first transparent substrate 1602 coincides with the long side of the second transparent substrate 1604.

The second and third transparent substrates 1604 and 1616 hold therein the second liquid crystal layer and the third and fourth alignment layers. They are bonded together such that one of the short sides of the second transparent substrate 1604 coincides with one of the short sides of the third transparent substrate 1616 and the long side of the second transparent substrate 1604 coincides with the long side of the third transparent substrate 1616.

The second transparent substrate 1616 has a projecting part 1616B that projects from the other short side of the first and third transparent substrates 1602 and 1616.

The projecting part 1616A has two surfaces, one facing the first transparent electrode 1606 and the other facing the fourth transparent electrode 1620. The first connecting terminal 1636 faces the first transparent electrode 1606, and the second connecting terminal 1638 faces the fourth transparent electrode 1620.

Therefore, the first and second connecting terminals 1636 and 1638 face opposite to each other in the thickness direction of the first and second liquid crystal layers.

As shown in FIGS. 4 and 15, the first connecting terminal 1636 is made up of the first connecting terminal 1628 and the second connecting terminal 1630. The first connecting terminal 1628 is electrically connected to the first transparent electrode 1606 on the second transparent substrate 1604 through the conducting material (not shown) that extends in the thickness direction of the first liquid crystal layer 1614 of the first liquid crystal light control element 16A. The second connecting terminal 1630 is electrically connected to the second transparent electrode 1608 on the second transparent substrate 1604.

The second connecting terminal 1638 is also constructed in the same way as the first connecting terminal 1636. That is, the second connecting terminal 1638 is made up of the third connecting terminal 1632 and the fourth connecting terminal 1634. The third connecting terminal 1632 is electrically connected to the third transparent electrode 1616 on the second transparent substrate 1604. The fourth connecting terminal 1634 is electrically connected to the fourth transparent electrode 1620 on the second transparent substrate 1604 through the conducting material which extends in the thickness direction of the second liquid crystal layer 1626 of the second liquid crystal light control element 16B.

As mentioned above, the first and second connecting terminals 1636 and 1638 are formed on the different surfaces of the single projecting part 1604B. This structure saves the space occupied by the first and second connecting terminals 1636 and 1638. Moreover, in the case where driving voltage E is supplied from the outside of the liquid crystal light control element 16 to the first and second connecting terminals 1636 and 1638 through the conducting parts connected to the first and second connecting terminals 1636 and 1638, it is possible to construct the connecting parts with a single connector. This structure is desirable to build the liquid crystal light control element 16 and the conducting part into the lens barrel 10 easily and to reduce the entire size of the imaging device.

EXAMPLE 4

Example 4 differs from Example 1 in the length of the first, second, and third transparent substrates 1602, 1604, and 1616.

Figure 16:
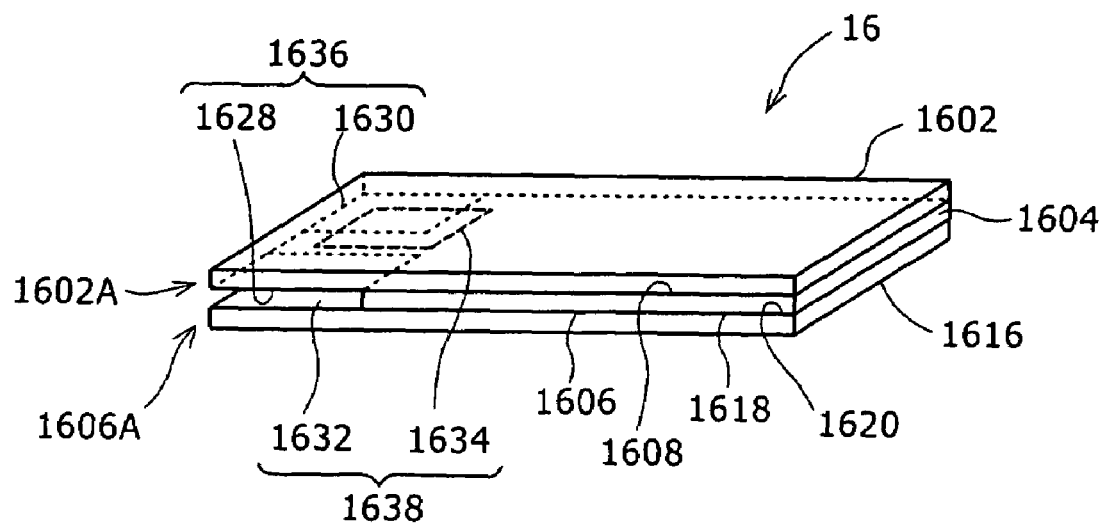
FIG. 16 is a perspective view showing the structure of the liquid crystal light control element 16 in Example 4.

FIG. 16 is a perspective view showing the structure of the liquid crystal light control element 16 in Example 4.

As shown in FIG. 16, both the first and third transparent substrates 1602 and 1616 assume a rectangular shape of the same size. The second transparent substrate 1604 also assumes a rectangular shape, with its short side equal to that of said rectangle and its long side smaller than that of said rectangle.

The first and second transparent substrates 1602 and 1604 hold therein the first liquid crystal layer and the first and second alignment layers. They are bonded together such that one of the short sides of the first transparent substrate 1602 coincides with one of the short sides of the second transparent substrate 1604 and the long side of the first transparent substrate 1602 coincides with the long side of the second transparent substrate 1604.

The first transparent substrate 1602 has a first projecting part 1602A that projects from the other short side of the second transparent substrate 1604.

The second and third transparent substrates 1604 and 1616 hold therein the second liquid crystal layer and the third and fourth alignment layers. They are bonded together such that one of the short sides of the third transparent substrate 1616 coincides with one of the short sides of the second transparent substrate 1616, and the long side of the second transparent substrate 1604 coincides with the long side of the third transparent substrate 1616.

The third transparent substrate 1616 has a second projecting part 1616A that projects from the other short side of the second transparent substrate 1602. The first and second projecting parts 1602A and 1616A are positioned at the end of the long sides of the first and second transparent substrates 1602 and 1604.

The first projecting part 1604A has two surfaces, one facing the second transparent electrode 1608 and the other facing the opposite side. The first connecting terminal 1636 faces the second transparent electrode 1608. The second projecting part 1638 has two surfaces, one facing the third transparent electrode 1618 and the other facing the opposite side. The second connecting terminal 1638 faces the third transparent electrode 1618. Therefore, the first connecting terminal 1636 and second connecting terminal 1638 face each other.

As shown in FIGS. 4 and 16, the first connecting terminal 1636 is made up of the first connecting terminal 1628 and the second connecting terminal 1630. The first connecting terminal 1628 is electrically connected to the first transparent electrode 1606 on the first transparent substrate 1602. The second connecting terminal 1630 is electrically connected to the second transparent electrode 1606 on the first transparent substrate 1604 through the conducting material 1640 that extends in the thickness direction of the first liquid crystal layer 1614 of the first liquid crystal light control element 16A.

The second connecting terminal 1638 is also constructed in the same way as the first connecting terminal 1636. That is, the second connecting terminal 1638 is made up of the third connecting terminal 1632 and the fourth connecting terminal 1634, which are formed on the third transparent substrate 1616. The third connecting terminal 1632 is electrically connected to the third transparent electrode 1618 through the conducting material which extends in the thickness direction of the second liquid crystal layer 1626 of the second liquid crystal light control element 16B. The fourth connecting terminal 1634 is electrically connected to the fourth transparent electrode 1620 on the third transparent substrate 1616.

As mentioned above, the first connecting terminal 1636 of the first projecting part 1604A and the second connecting terminals 1638 of the second projecting part 1616A are positioned at the end of the long sides of the first and second transparent substrates 1602 and 1604 and face each other. This structure saves the space occupied by the first and second connecting terminals 1636 and 1638. Moreover, in the case where driving voltage E is supplied from the outside of the liquid crystal light control element 16 to the first and second connecting terminals 1636 and 1638 through the conducting parts connected to the first and second connecting terminals 1636 and 1638, it is possible to construct the connecting parts with a single connector. This structure is desirable to build the liquid crystal light control element 16 and the conducting part into the lens barrel 10 easily and to reduce the entire size of the imaging device.

EXAMPLE 5

Example 5 differs from Example 1 in the shape of the first, second, and third transparent substrates 1602, 1604, and 1616.

Figure 17:
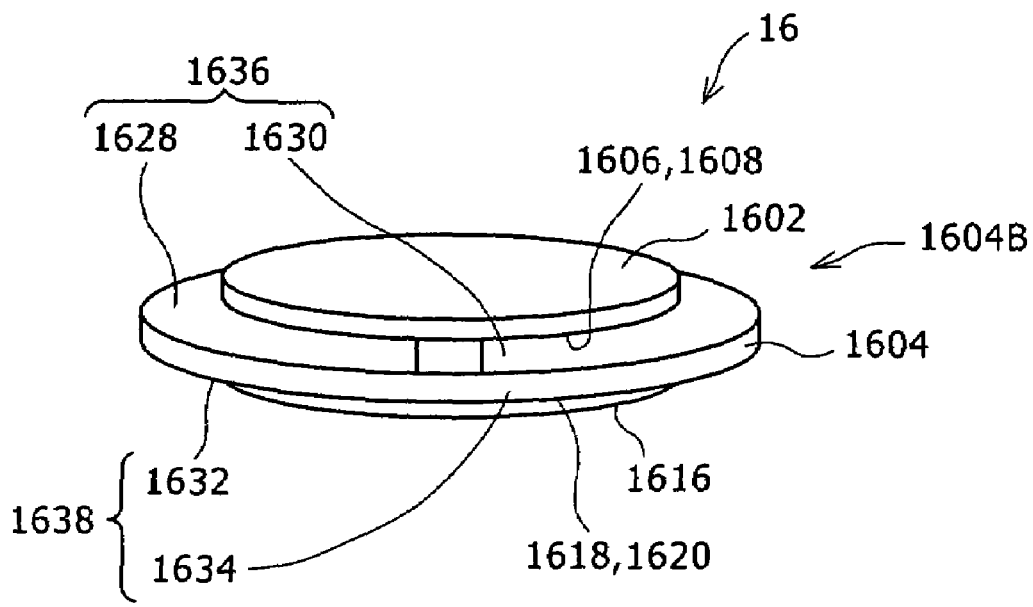
FIG. 17 is a perspective view showing the structure of the liquid crystal light control element 16 in Example 5.

FIG. 17 is a perspective view showing the structure of the liquid crystal light control element 16 in Example 5.

As shown in FIG. 17, both the first and third transparent substrates 1602 and 1616 assume a discoid shape of the same diameter. The second transparent substrate 1604 also assumes a discoid shape but is larger in diameter than the first and third transparent substrates 1602 and 1616. The first, second, and third transparent substrates 1602, 1604, and 1616 are bonded together so that their centers align. The first and second transparent substrates 1602 and 1604 hold therein the first liquid crystal layer and the first and second alignment layers. The second and third transparent substrates 1604 and 1616 hold therein the second liquid crystal layer and the third and fourth alignment layers.

The second transparent substrate 1616 has a projecting part 1616B that projects from the periphery of the first and third transparent substrates 1602 and 1616. One of the circular surfaces of the projecting part 1616B faces the first transparent substrate 1602, and the other of the circular surfaces of the projecting part 1616B faces the third transparent substrate 1616.

The first connecting terminal 1636 is positioned on the circular surface facing the first transparent electrode 1606, and the second connecting terminal 1638 is positioned on the circular surface facing the fourth transparent electrode 1620.

Therefore, the first and second connecting terminals 1636 and 1638 face each other (in the thickness direction of the first and second liquid crystal layers) on the projecting part 1616B.

As shown in FIGS. 4 and 17, the first connecting terminal 1636 is made up of the first connecting terminal 1628 and the second connecting terminal 1630. The first connecting terminal 1628 is electrically connected to the first transparent electrode 1606 on the second transparent substrate 1603 through a conducting material (not shown) that extends in the thickness direction of the first liquid crystal layer 1614 of the first liquid crystal light control element 16A. The second connecting terminal 1630 is electrically connected to the second transparent electrode 1606 on the second transparent substrate 1604.

The second connecting terminal 1638 is also constructed in the same way as the first connecting terminal 1636. That is, the second connecting terminal 1638 is made up of the third connecting terminal 1632 and the fourth connecting terminal 1634. The third connecting terminal 1632 is electrically connected to the third transparent electrode 1618 on the second transparent substrate 1604. The fourth connecting terminal 1634 is electrically connected to the fourth transparent electrode 1620 on the second transparent substrate 1604 through the conducting material which extends in the thickness direction of the second liquid crystal layer 1626 of the second liquid crystal light control element 16B.

As mentioned above, the first and second connecting terminals 1636 and 1638 are positioned on both sides of the circular projecting part 1604B. This structure saves the space occupied by the first and second connecting terminals 1636 and 1638. Moreover, being circular, the first, second, and third transparent substrates 1602, 1604, and 1616 can be easily positioned when the liquid crystal light control element 16 is built into a cylindrical member; it is only necessary to fit the periphery of the liquid crystal light control element 16 to the inside. This structure is desirable to build the liquid crystal light control element 16 and the conducting part into the lens barrel 10 easily and to reduce the entire size of the imaging device.

EXAMPLE 6

Example 6 differs from Example 1 in the shape of the first, second, and third transparent substrates 1602, 1604, and 1616.

Figure 18:
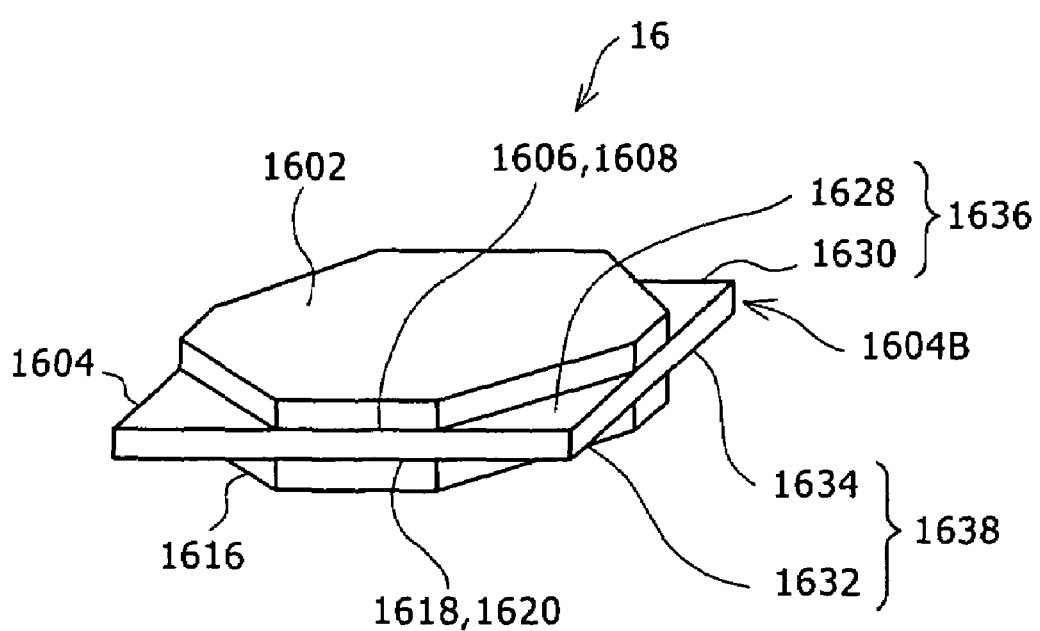
FIG. 18 is a perspective view showing the structure of the liquid crystal light control element 16 in Example 6.

FIG. 18 is a perspective view showing the structure of the liquid crystal light control element 16 in Example 6.

As shown in FIG. 18, both the first and third transparent substrates 1602 and 1616 assume an octagonal shape of the same size. The second transparent substrate 1604 assumes a square shape, which is larger than the first and third transparent substrates 1602 and 1604. The first, second, and third transparent substrates 1602, 1604, and 1616 are bonded together such that every other sides of the octagon of the first and third transparent substrate 1602 and 1616 coincide with the four sides of the square of the second transparent substrate 1604. The first and second transparent substrates 1602 and 1604 hold between them the first liquid crystal layer and the first and second alignment layers. The second and third transparent substrates 1604 and 1616 hold between them the second liquid crystal layer and the third and fourth alignment layers.

The second transparent substrate 1616 has four corners projecting from the four sides of the first and third transparent substrates 1602 and 1616. These corners constitute the four triangular projections 1616B. One of the two adjacent projecting sides 1616B faces the first transparent substrate 1602, and one of the other two adjacent projecting sides 1616B faces the second transparent substrate 1616.

The first connecting terminal 1636 is positioned on the surface facing the first transparent electrode 1606 of the two projecting parts 1616B out of the four projecting parts 1616B. The second connecting terminal 1638 is positioned on the surface of the two projecting parts 1616B which face the fourth transparent electrode 1620. Therefore, the first and second connecting terminals 1636 and 1638 on the projecting part 1616B face oppositely in the thickness direction of the first and second liquid crystal layers.

As shown in FIGS. 4 and 18, the first connecting terminal 1636 is made up of the first connecting terminal 1628 and the second connecting terminal 1630. The first connecting terminal 1628 is electrically connected to the first transparent electrode 1606 on the second transparent substrate 1604 through a conducting material (not shown) that extends in the thickness direction of the first liquid crystal layer 1614 of the first liquid crystal light control element 16A. The second connecting terminal 1630 is electrically connected to the second transparent electrode 1606 on the second transparent substrate 1604.

The second connecting terminal 1638 is also constructed in the same way as the first connecting terminal 1636. That is, the second connecting terminal 1638 is made up of the third connecting terminal 1632 and the fourth connecting terminal 1634. The third connecting terminal 1632 is electrically connected to the third transparent electrode 1618 on the second transparent substrate 1604. The fourth connecting terminal 1634 is electrically connected to the fourth transparent electrode 1620 on the second transparent substrate 1604 through the conducting material which extends in the thickness direction of the second liquid crystal layer 1626 of the second liquid crystal light control element 16B.

As mentioned above, the first and second connecting terminals 1636 and 1638 are positioned on both sides of the two projecting parts 1604B. This structure saves the space occupied by the first and second connecting terminals 1636 and 1638. Thus, this structure is desirable to build the liquid crystal light control element 16 and the conducting part into the lens barrel 10 easily and to reduce the entire size of the imaging device.

In Examples 1 to 6 mentioned above, the first and second liquid crystal light control elements 16A and 16B are placed on top of the other, and the second transparent substrate 1604 is interposed between them so that it functions as the transparent substrate for the first and second liquid crystal light control elements 16A and 16B. However, this structure may be modified such that an additional transparent substrate is interposed between the first and second liquid crystal light control elements 16A and 16B.

Such modified examples will be described below with reference to FIGS. 19 to 24.

The modified examples are characterized by the following. The first liquid crystal light control element 16A has the first and second transparent substrates 1602 and 1604, and the second liquid crystal light control element 16B has the third and fourth transparent substrates 1616 and 1617. The first and second transparent substrates 1602 and 1604 are bonded together such that they hold between them the first liquid crystal layer and the first and second alignment layers. The third and fourth transparent substrates 1616 and 1617 are bonded together such that they hold between them the second liquid crystal layer and the third and fourth alignment layers. The second and third transparent substrates 1604 and 1616 are bonded together such that they are placed on top of the other.

Figure 19:
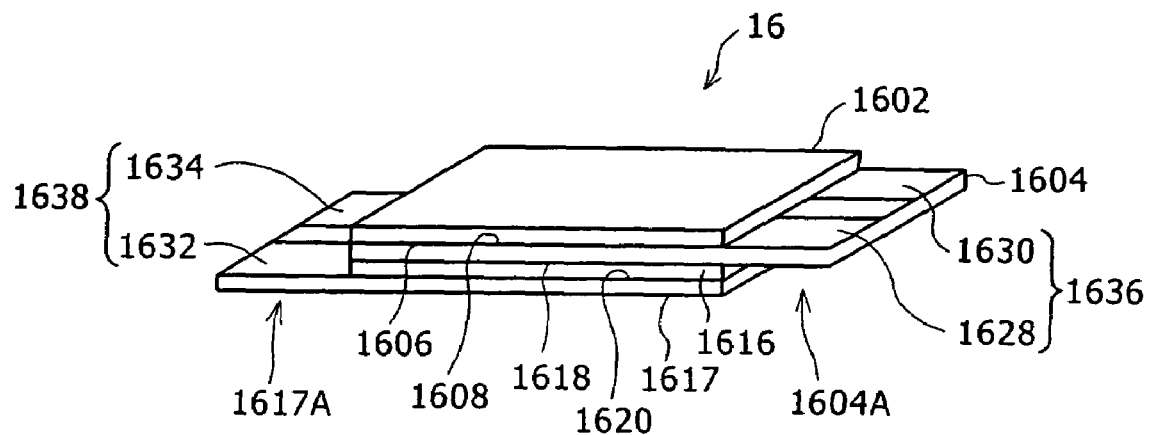
FIG. 19 is a perspective view showing the structure of the modified liquid crystal light control element 16 in Example 1.

FIG. 19 shows a modification of Example 1 shown in FIG. 12, which is characterized in that the first projecting part 1604A projects from the second transparent substrate 1604, the second projecting part 1617A projects from the fourth transparent substrate 1617, the first connecting terminal 1636 is formed on the first projecting part 1604A, and the second connecting terminal 1638 is formed on the second projecting part 1607A.

Figure 20:
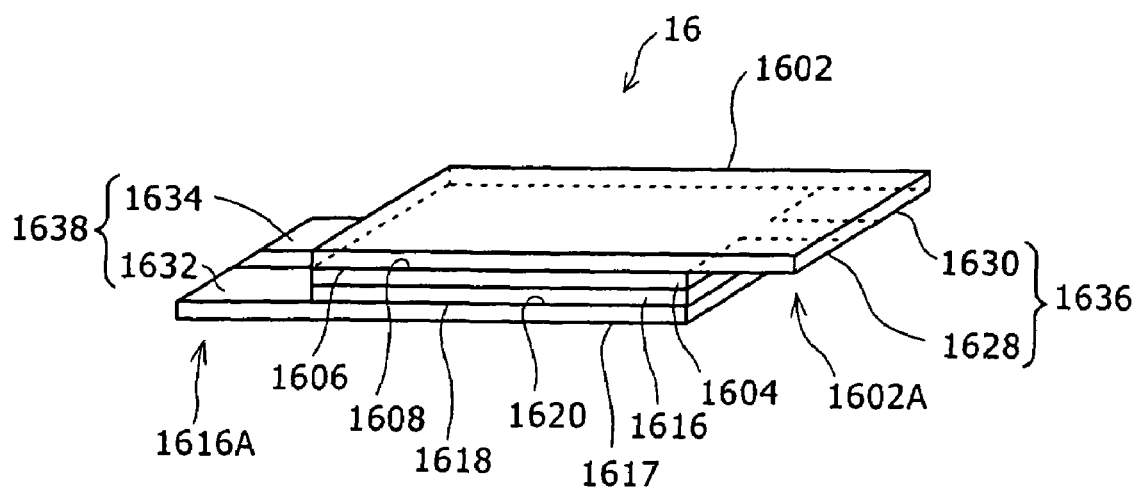
FIG. 20 is a perspective view showing the structure of the modified liquid crystal light control element 16 in Example 2.

FIG. 20 shows a modification of Example 2 shown in FIG. 14, which is characterized in that the first projecting part 1602A projects from the first transparent substrate 1602, the second projecting part 1617A projects from the fourth transparent substrate 1617, the first connecting terminal 1636 is formed on the first projecting part 1602A, and the second connecting terminal 1638 is formed on the second projecting part 1607A.

Figure 21:
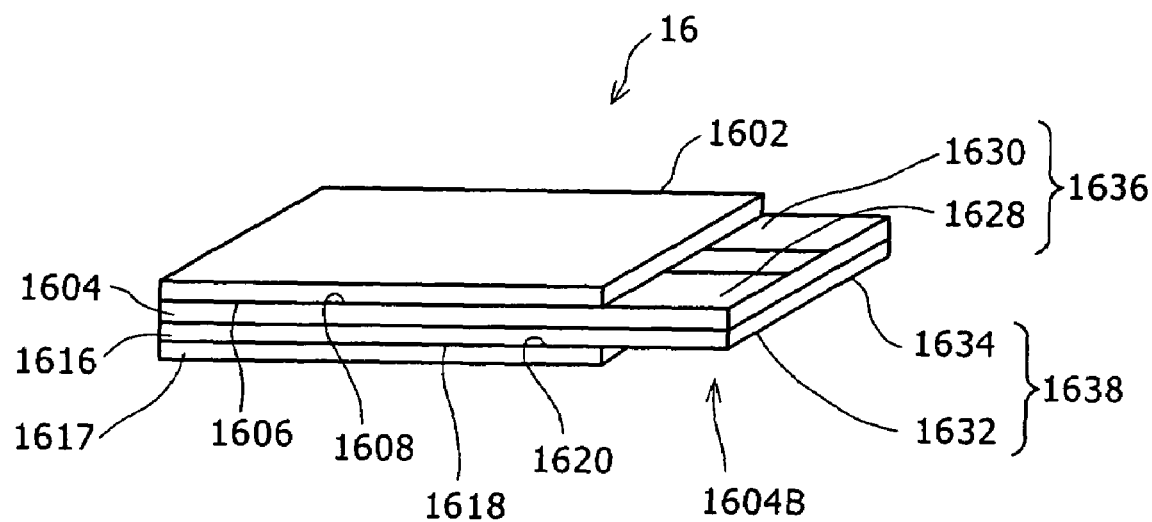
FIG. 21 is a perspective view showing the structure of the modified liquid crystal light control element 16 in Example 3.

FIG. 21 shows a modification of Example 3 shown in FIG. 15, which is characterized in that the projecting part 1604B projects from the second and third transparent substrates 1604 and 1616, and the first and second connecting terminals 1636 and 1638 are formed on the different surface of the projecting part 1604B.

Figure 22:
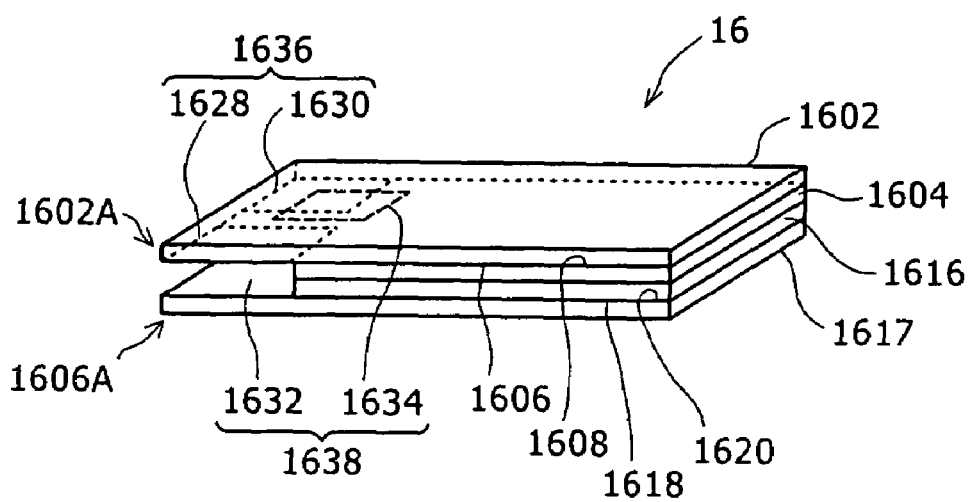
FIG. 22 is a perspective view showing the structure of the modified liquid crystal light control element 16 in Example 4.

FIG. 22 shows a modification of Example 4 shown in FIG. 16, which is characterized in that the first projecting part 1602A projects from the first transparent substrate 160, the second projecting part 1617A projects from the fourth transparent substrate 1617, the first connecting terminal 1636 is formed on the first projecting part 1602A, and the second connecting terminal 1638 is formed on the second projecting part 1607A.

Figure 23:
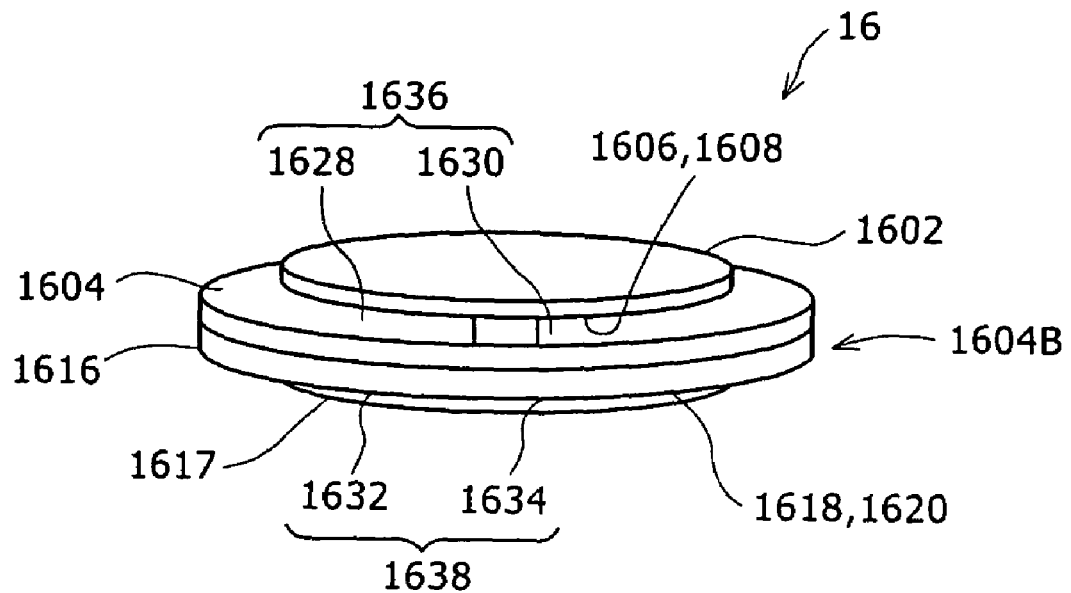
FIG. 23 is a perspective view showing the structure of the modified liquid crystal light control element 16 in Example 5.

FIG. 23 shows a modification of Example 5 shown in FIG. 17, which is characterized in that the projecting part 1604B projects from the second and third transparent substrates 1604 and 1616, and the first and second connecting terminals 1636 and 1638 are formed on the different surface of the projecting part 1604B.

Figure 24:
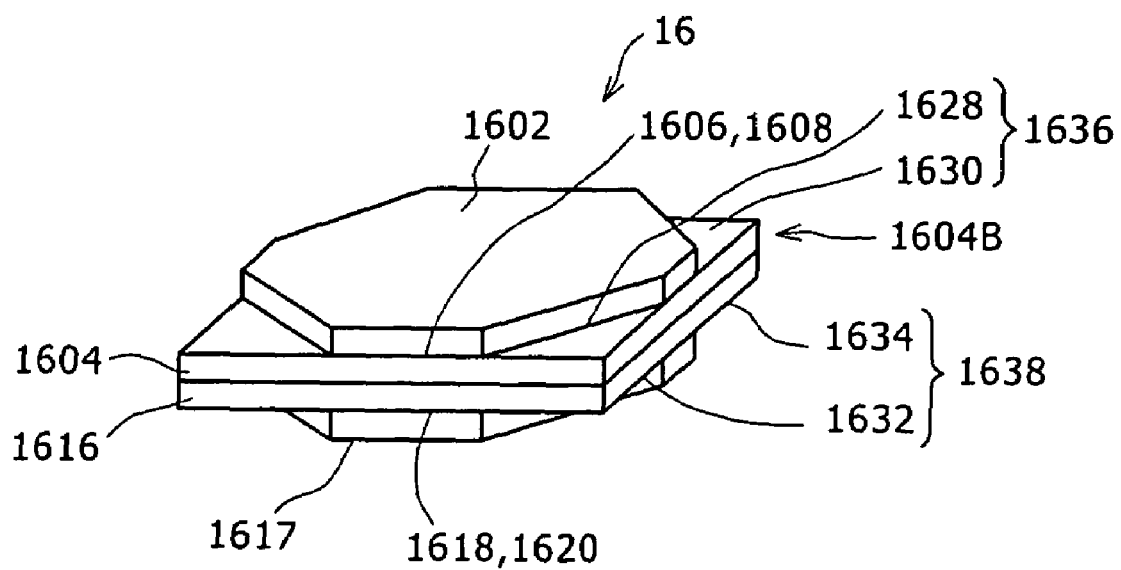
FIG. 24 is a perspective view showing the structure of the modified liquid crystal light control element 16 in Example 6.

FIG. 24 shows a modification of Example 6 shown in FIG. 18, which is characterized in that the projecting part 1604B projects from the second and third transparent substrates 1604 and 1616, and the first and second connecting terminals 1636 and 1638 are formed on the different surface of the projecting part 1604B.

These modified examples work as well as Examples 2 to 6 to produce the same effect.

The foregoing examples are concerned with the structure in which two liquid crystal light control elements (or the first and second liquid crystal light control elements 16A and 16B) are placed on top of the other in their thickness direction. However, more than two elements may be placed one over another so as to expand the range of control of the transmitted light.

Moreover, the foregoing examples are concerned with the structure in which the liquid crystal layer is of guest-host type (composed of host material and guest material) and the liquid crystal molecules assume a rod like shape. The liquid crystal layer is not limited to the one mentioned above. There are no restrictions on the material constituting the liquid crystal layer and the shape of liquid crystal molecules so long as the liquid crystal layer is capable of controlling the amount of light passing in the thickness direction.

Finally, the foregoing examples are mentioned on the assumption that the imaging device is a digital still camera. However, the present invention is apparently applicable to any other imaging devices, such as video camera and television camera, mobile phones with a camera, and electronic machines with a lens barrel.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A liquid crystal light control element comprising a plurality of liquid crystal light control units, each having a liquid crystal layer held between transparent electrodes, which are placed on top of each other in a thickness direction of said liquid crystal layers, each of said liquid crystal light control units constructed to control an amount of light passing in the thickness direction of said liquid crystal layers in response to a voltage applied to said transparent electrodes, wherein said plurality of liquid crystal light control units are composed of a first liquid crystal light control unit and a second liquid crystal light control unit which are placed on top of the other, said first liquid crystal light control unit having a first and a second transparent substrates extending parallel to each other a certain distance apart, a first and a second transparent electrodes formed on opposing sides of the first and second transparent substrates, a first and a second alignment layers formed on the opposing sides of the first and second transparent electrodes, and a first liquid crystal layer sealed between the first and second alignment layers, said second liquid crystal light control unit having the second transparent substrate and a third transparent substrate extending parallel to each other a certain distance apart, a third and a fourth transparent electrodes formed on the opposing sides of the second and third transparent substrates, a third and a fourth alignment layers formed on the opposing sides of the third and fourth transparent electrodes, and a second liquid crystal layer sealed between the third and fourth alignment layers, said second transparent substrate having a first projecting part that projects from said first transparent substrate, said first projecting part having a first connecting terminal electrically connected to said first and second transparent electrodes, said third transparent substrate having a second projecting part that projects from said second transparent substrate, said second projecting part having a second connecting terminal electrically connected to the third and fourth transparent electrodes, wherein the first and second liquid crystal layers comprise rod-like crystal molecules which incline while maintaining parallel long axes.

2. The liquid crystal light control element according to claim 1, wherein said first projecting part has a surface facing said first transparent electrode and a surface facing said fourth transparent electrode, said first connecting terminal is formed on the surface facing said first transparent electrode, said second projecting part has a surface facing the opposite side of the surface facing said third transparent electrode, and said second connecting terminal is formed on the surface facing the third transparent electrode.

3. The liquid crystal light control element according to claim 1, wherein said first transparent substrate includes a rectangular shape, said second transparent substrate includes a rectangular shape, with a short side being equal to a short side of said rectangular shape and a long side being larger than a long side of said rectangular shape, and said first projecting part is constructed of that part of the second transparent substrate which projects from the short side of said first transparent substrate.

4. The liquid crystal light control element according to claim 1, wherein said second transparent substrate includes a rectangular shape, said third transparent substrate includes a rectangular shape, with a short side being equal to a short side of said rectangular shape and a long side being larger than a long side of said rectangular shape, and said second projecting part is constructed of that part of the third transparent substrate which projects from the short side of said second transparent substrate.

5. The liquid crystal light control element according to claim 1, wherein said first transparent substrate includes a rectangular shape, said second transparent substrate includes a rectangular shape, with a short side being equal to a short side of said rectangular shape and a long side being larger than a long side of said rectangular shape, said first projecting part is constructed of that part of the second transparent substrate which projects from the short side of said first transparent substrate, said second transparent substrate includes a rectangular shape, said third transparent substrate includes a rectangular shape, with a short side being equal to said rectangular shape and a long side being larger than the long side of said second transparent substrate, and said second projecting part is constructed of that part of the third transparent substrate which projects from a short side of said second transparent substrate, and said first projecting part and said second projecting part are positioned at both ends in the long side direction of the first transparent substrate.

6. A liquid crystal light control element comprising a plurality of liquid crystal light control units, each having a liquid crystal layer held between transparent electrodes, which are placed on top of each other in a thickness direction of said liquid crystal layers, each of said liquid crystal light control units constructed to control an amount of light passing in the thickness direction of said liquid crystal layers in response to a voltage applied to said transparent electrodes, wherein said plurality of liquid crystal light control units are composed of a first liquid crystal light control unit and a second liquid crystal light control unit which are placed on top of the other, said first liquid crystal light control unit having a first and a second transparent substrates extending parallel to each other a certain distance apart, a first and a second transparent electrodes formed on the opposing sides of the first and second transparent substrates, a first and a second alignment layers formed on the opposing sides of the first and second transparent electrodes, and a first liquid crystal layer sealed between the first and second alignment layers, said second liquid crystal light control unit having the second transparent substrate and a third transparent substrate extending parallel to each other a certain distance apart, a third and a fourth transparent electrodes formed on the opposing sides of the second and third transparent substrates, a third and a fourth alignment layers formed on the opposing sides of the third and fourth transparent electrodes, and a second liquid crystal layer sealed between the third and fourth alignment layers, said first transparent substrate having a first projecting part that projects from said second transparent substrate, said first projecting part having a first connecting terminal electrically connected to said first and second transparent electrodes, said third transparent substrate having a second projecting part that projects from said second transparent substrate, and said second projecting part having a second connecting terminal electrically connected to the third and fourth transparent electrodes, and wherein said first transparent substrate includes a, rectangular shape, said second transparent substrate includes a rectangular shape, with a short side being equal to a short side of said rectangular shape and a long side being shorter than a long side of said rectangular shape, said, first projecting part is constructed of that part of the first transparent substrate which projects from the short side of said second transparent substrate, said third transparent substrate and its long side being larger than the long side of said second substrate, and said second projecting part is constructed of that part of the third transparent substrate which projects from the short side of said second transparent substrate, and said first projecting part and said second projecting part are positioned at one end in the long side direction of the first and second transparent substrates, wherein the first and second liquid crystal layers comprise rod-like crystal molecules which incline while maintaining parallel long axes.

7. A liquid crystal light control element comprising a plurality of liquid crystal light control units, each having a liquid crystal layer held between transparent electrodes, which are placed on top of each other in a thickness direction of said liquid crystal layers, each of said liquid crystal light control units constructed to control an amount of light passing in the thickness direction of said liquid crystal layers in response to a voltage applied to said transparent electrodes, wherein said plurality of liquid crystal light control units are composed of a first liquid crystal light control unit and a second liquid crystal light control unit which are placed on top of each other, said first liquid crystal light control unit having a first and a second transparent substrates extending parallel to each other a certain distance apart, a first and a second transparent electrodes formed on opposing sides of the first and second transparent substrates, a first and a second alignment layers formed on opposing sides of the first and second transparent electrodes, and a first liquid crystal layer sealed between the first and second alignment layers, said second liquid crystal light control unit having the second transparent substrate and a third transparent substrate extending parallel to each other a certain distance apart, a third and a fourth transparent electrodes formed on the opposing sides of the second and third transparent substrates, a third and a fourth alignment layers formed on the opposing sides of the third and fourth transparent electrodes, and a second liquid crystal layer sealed between the third and fourth alignment layers, said first transparent substrate having a first projecting part that projects from said second transparent substrate, said first projecting part having a first connecting terminal electrically connected to said first and second transparent electrodes, said third transparent substrate having a second projecting part that projects from said second transparent substrate, and said second projecting part having a second connecting terminal electrically connected to the third and fourth transparent electrodes, wherein the first and second liquid crystal layers comprise rod-like crystal molecules which incline while maintaining parallel long axes.

8. The liquid crystal light control element according to claim 7, wherein said first projecting part has a surface facing said second transparent electrode and a surface facing the opposite side, said first connecting terminal is formed on the surface facing said second transparent electrode, said second projecting part has a surface facing said third transparent electrode and its opposite side, and said second connecting terminal is formed on the surface facing the third transparent electrode.

9. The liquid crystal light control element according to claim 7, wherein said first transparent substrate includes a rectangular shape, said second transparent substrate includes a rectangular shape, with a short side being equal to a short side of said rectangular shape and a long side being smaller than a long side of said rectangular shape, and said first projecting part is constructed of that part of the first transparent substrate which projects from the short side of said second transparent substrate.

10. The liquid crystal light control element according to claim 7, wherein said third transparent substrate includes a rectangular shape, said second transparent substrate includes a rectangular shape, with a short side being equal to a short side of said rectangular shape and a long side being smaller than a long side of said rectangular shape, and said second projecting part is constructed of that part of the third transparent substrate which projects from the short side of said second transparent substrate.

11. The liquid crystal light control element according to claim 7, wherein said first transparent substrate assumes a rectangular shape, said second transparent substrate includes a rectangular shape, with a short side being equal to a short side of said rectangular shape and a long side being smaller than a long side of said rectangular shape, said first projecting part is constructed of that part of the first transparent substrate which projects from the short side of said second transparent substrate, said third transparent substrate includes a rectangular shape, with a short side being equal to a short side of said second substrate and a long side being larger than a long side of said second substrate, and said second projecting part is constructed of that part of the third transparent substrate which projects from the short side of said second transparent substrate, and said first projecting part and said second projecting part are positioned at both ends in the long side direction of the first and second transparent substrates.

* * * * *